(12) United States Patent
Werness et al.

(10) Patent No.: US 8,942,474 B2
(45) Date of Patent: Jan. 27, 2015

(54) METHOD AND SYSTEM FOR INTERPOLATING INDEX VALUES OF ASSOCIATED TILES IN AN IMAGE

(75) Inventors: Eric Sovelen Werness, San Jose, CA (US); Walter E. Donovan, Saratoga, CA (US); Cass Watson Everitt, Austin, TX (US)

(73) Assignee: Nvidia Corporation, Santa Clara, CA (US)

( * ) Notice: Subject to any disclaimer, the term of this patent is extended or adjusted under 35 U.S.C. 154(b) by 89 days.

(21) Appl. No.: 13/553,737

(22) Filed: Jul. 19, 2012

(65) Prior Publication Data

US 2013/0022265 A1 Jan. 24, 2013

Related U.S. Application Data

(60) Provisional application No. 61/509,405, filed on Jul. 19, 2011.

(51) Int. Cl.
*G06K 9/00* (2006.01)
*G06T 9/00* (2006.01)
*G06T 15/00* (2011.01)

(52) U.S. Cl.
CPC .............. *G06T 15/005* (2013.01); *G06T 9/00* (2013.01)
USPC ........................................ 382/166

(58) Field of Classification Search
CPC ....... G06K 9/64; G06K 15/00; G06K 15/027; G06K 2215/10082; G06K 2215/0094; H04N 1/40012; H04N 1/644; H04N 19/0078; H04N 19/00096; H04N 19/00139; H04N 19/0026; H04N 19/00303; H04N 19/00315; H04N 19/00387; H04N 19/00484; H04N 19/00575; H04N 19/00775; H04N 19/00957; G06T 3/4038; G06T 5/007; G06T 9/00; G06T 11/00; G06T 2207/20021
See application file for complete search history.

(56) References Cited

U.S. PATENT DOCUMENTS

| | | | | |
|---|---|---|---|---|
| 5,734,744 | A * | 3/1998 | Wittenstein et al. | 382/166 |
| 6,026,180 | A * | 2/2000 | Wittenstein et al. | 382/166 |
| 7,039,241 | B1 * | 5/2006 | Van Hook | 382/232 |
| 7,565,028 | B2 * | 7/2009 | Saed | 382/284 |
| 8,111,928 | B2 * | 2/2012 | Van Hook et al. | 382/232 |
| 8,411,942 | B2 * | 4/2013 | Chen et al. | 382/166 |
| 2012/0213435 | A1 | 8/2012 | Donovan et al. | |

* cited by examiner

*Primary Examiner* — Jose Couso

(57) ABSTRACT

A method for performing indexing in an image decoder. The method includes identifying a tile in an image, wherein the image comprises a plurality of tiles, and wherein each tile includes color data associated with a plurality of pixels. The method includes asymmetrically providing a plurality of indices throughout the tile. The method includes identifying a pixel in the tile. The method also includes determining a corresponding rectangular grid that includes the pixel, wherein the corresponding rectangular grid comprises at least one indices in a group of indices. The method includes determining an index for the pixel by bilinearly filtering the group of indices that is associated with the corresponding rectangular grid, wherein the filtering is performed in relation to the pixel.

19 Claims, 66 Drawing Sheets

200A

```
plane    plane 0    plane 1    final returned
mode     channels   channels   color
-----    --------   --------   --------------
1        r                     r 0 0 65535
2        rg                    r g 0 255
3        rgb                   r g b 255
4        rgba                  r g b a
1+1      r          G          r G 0 65535
3+1      rgb        A          r g b A
2+2      rg         BA         r g B A
```

```
              plane_mode
bpp   1   2   3   4   1+1  3+1  2+2
---   -   -   -   -   ---  ---  ---
1     X   X   X   X   -    -    -
2     X   X   X   X   X    X    X
4     X   X   X   X   X    X    X (X is allowable, - isn't)
```

FIG. 2B

```
bpp     1   2   3     plane_mode
                      1   4   1+1 3+1 2+2
 -      -   -   -     -   -   -   -
 1      8x8 8x8 8x8   -   -   -   -
 2      4x8 4x8 4x8   8x8 8x8 8x8 8x8
 4      4x4 4x4 4x4   4x8 4x8 4x8 4x8
                                  4x4 4x4 4x8
```

```
bx1 = (ix + tw/2)/tw;
bx0 = bx1 - 1;
if (is_wrapped) {if (bx1 >= bw) bx1 = 0;  if (bx0 < 0) bx0 = bw-1;}
else            {if (bx1 >= bw) bx1 = bw-1; if (bx0 < 0) bx0 = 0;}
```

200D

```
[bit 63 ...                                      ... bit 0]
[32b qwts0][28b qvals0][1b vctl0][3b wctl0]
```

FIG. 3A

```
[bit 63 ...                                      ... bit 0]
[32b qwts0][26b qvals0][3b vctl0][3b wctl0]
```

FIG. 3B

```
[bit 127 ...
[32b qwts1][28b qvals1][1b vctl1][3b wctl1]
[32b qwts0][28b qvals0][1b vctl0][3b wctl0]
                                   ... bit 0]
```

FIG. 3C

```
[bit 127 ...
[32b qwts1][14b qvals1][14b qvals0_hi][1b vctl1][3b wctl1]
[32b qwts0][      28b qvals0_lo      ][1b vctl0][3b wctl0]
                                                 ... bit 0]
```

| plane_mode | ch3 | ch2 | ch1 | ch0 | vct11 | vct10 | ch3_sq | left_right_sq |
|---|---|---|---|---|---|---|---|---|
| 1 |  |  |  | 10,10 |  | unused |  | no |
| 2 |  |  | 7,7 | 7,7 |  | 0 |  | no |
| 2 |  |  | 6,8 | 6,8 |  | 1 |  | yes |
| 3 |  | 4,4 | 5,5 | 5,5 |  | 0 |  | no |
| 3 |  | 3,5 | 4,6 | 4,6 |  | 1 |  | yes |
| 4 |  | 4,4 | 5,5 | 4,4 |  | 0 |  | no |
| 4 | 3,0 | 3,4 | 4,5 | 3,4 |  | 1 | no |  |
| 4 | 0,3 | 4,3 | 5,4 | 4,3 |  | 2 | no |  |
| 4 | 3,3 | 3,3 | 4,4 | 3,3 |  | 3 | no |  |
| 4 |  | 3,5 | 4,6 | 3,5 |  | 4 |  | yes |
| 4 | 4,0 | 2,4 | 3,5 | 3,5 |  | 5 | no | yes |
| 4 | 0,4 | 2,4 | 3,5 | 3,5 |  | 6 | no | yes |
| 4 | 2,4 | 2,4 | 3,5 | 2,4 |  | 7 | yes | yes |
| 1+1 |  |  | 10,10 | 10,10 | unused | unused |  | no |
| 2+2 | 7,7 | 7,7 | 7,7 | 7,7 | 0 | 0 |  | no |
| 2+2 | 7,7 | 7,7 | 6,8 | 6,8 | 0 | 1 |  | no |
| 2+2 | 6,8 | 6,8 | 7,7 | 7,7 | 1 | 0 |  | yes |
| 2+2 | 6,8 | 6,8 | 6,8 | 6,8 | 1 | 1 |  | yes |
| 3+1 | 7,7 | 7,7 | 7,7 | 7,7 | 0 | 0 |  | no |
| 3+1 | 7,7 | 6,8 | 6,8 | 6,8 | 0 | 1 |  | no |
| 3+1 | 6,8 | 7,7 | 7,7 | 7,7 | 1 | 0 |  | yes |
| 3+1 | 6,8 | 6,8 | 6,8 | 6,8 | 1 | 1 |  | yes |

| plane_mode | ch3 | ch2 | ch1 | ch0 |
|---|---|---|---|---|
| 1 | | | | qval0 |
| 2 | | | qval0 | qval0 |
| 3 | | qval0 | qval0 | qval0 |
| 4 | qval0 | qval0 | qval0 | qval0 |
| 1+1 | | | qval1 | qval0 |
| 2+2 | | qval1 | qval0 | qval0 |
| 3+1 | qval1 | qval0 | qval0 | qval0 |

```
[bit 27 ...                     ... bit 0]
unused[7:0]  ch0_v1[9:0]  ch0_v0[9:0]
```

[bit 27 ...: ... bit 0]
[ch3_v1[2:0] ch2_v1[2:0] ch2_v0[3:0] ch1_v1[3:0] ch1_v0[4:0] ch0_v1[2:0] ch0_v0[3:0]]

```
static void uq_pow2(bool sq, int v0, int v0p, int v1, int v1p, int &base, int &delta)
{
    if (sq) v1p = v0p;              // if squeezed, use the higher precision for both values
    v1 = v1+v0;                      // undo the subtraction
    v1 &= (1<<v1p) - 1;              // mask the result to v1's actual precision
    int uv0 = bit_replicate(v0, v0p);
    int uv1 = bit_replicate(v1, v1p);
    base = uv0;
    delta = uv1-uv0;
    [
```

FIG. 3I

```
static int bit_replicate(int v, int vp)
{
    if (vp >= 8)
        return v;                                   // 8 bit is not unquantized, 10 bit is unquantized later
    else if(8 > vp && vp >= 4)
        return (v << (8-vp)) | (v >> (2*vp - 8));
    else if (vp == 3)
        return (v << (8-vp)) | (v << (8 - 2*vp)) | (v >> (3*vp - 8));
    else if (vp == 2)
        return v * 0x55;
    else if (vp == 1)                               // this is never used but left in for completeness
        return v * 0xFF;
}
```

```
static void uq_pow2pi(bool sq, int v0, int v0p, int v1, int v1p, int &base, int &delta)
{
    if (sq) v1p = v0p;                  // if squeezed, use the higher precision for both values
    v1 = v1+v0;                         // undo the subtraction
    v1 &= (1<<v1p) - 1;                 // mask the result to v1's actual precision
    int uv0 = (v0p == 0) ? 255 : (v0 << (8 - v0p));
    int uv1 = (v1p == 0) ? 255 : (v1 << (8 - v1p));
    base = uv0;
    delta = uv1-uv0;
}
```

| wctl | bits/qwt | # qwts | shape | name | step 2 | step 3 |
|---|---|---|---|---|---|---|
| 000b | 2 | 16 | grid | 2_1 | none | none |
| 001b | 4 | 8 | 50% ckbd | 4_2 | none | plus filter |
| 010b filter | 4 | 8 | 50% ckbd | 4_2_H | none | horizontal |
| 011b filter | 4 | 8 | 50% ckbd | 4_2_V | none | vertical filter |
| 100b | 3 or 4 | 4, 5, or 6 | partitioned | PART_4x2 | none | none |
| 101b | 3 or 4 | 4, 5, or 6 | partitioned | PART_2x4 | none | none |
| 110b | 4 | 8 | 2x4 grid | 2Y_4X | bilinear | none |
| 111b | 4 | 8 | 4x2 grid | 4Y_2X | bilinear | none |

| wctl | bits/qwt | # qwts | shape | name | step 2 | step 3 |
|---|---|---|---|---|---|---|
| 000b | 1 | 32 | grid | 1_1 | none | none |
| 001b | 2 | 16 | 50% ckbd | 2_2 | none | plus filter horizontal |
| 010b | 2 | 16 | 50% ckbd | 2_2_H | none | horizontal |
| filter |  |  |  |  |  | vertical filter |
| 011b | 2 | 16 | 50% ckbd partitioned | 2_2_v | none | none |
| 100b | 3 or 4 | 4, 5, or 6 | partitioned | PART_4x4 | none | ecks, |
| 101b | 4 | 8 | grid | 4_4 | none | none |
| horizontal, vertical filters |  |  |  |  |  |  |
| 110b | 4 | 8 | 2x4 grid | 2Y_4X | bilinear | none |
| 111b | 4 | 8 | 4x2 grid | 4Y_2X | bilinear | none |

| wctl | bits/qwt | # qwts | shape | name | step 2 | step 3 |
|---|---|---|---|---|---|---|
| 000b | 2 | 16 | grid | 2_4 | none | ecks, |
| horizontal, vertical filters | | | | | | |
| 001b | 1 | 32 | 50% ckbd | L2 | none | plus filter horizontal |
| 010b | 1 | 32 | 50% ckbd | L2_H | none | horizontal |
| 011b | 1 | 32 | 50% ckbd | L2_V | none | vertical filter |
| 100b | 3 or 4 | 4, 5, or 6 | partitioned | PART_8x4 | none | vertical filter |
| 101b | 3 or 4 | 4, 5, or 6 | partitioned | PART_4x8 | none | horizontal |
| filter | | | | | | |
| 110b | 4 | 8 | 2x4 grid | 2v_4x | bilinear | none |
| 111b | 4 | 8 | 4x2 grid | 4v_2x | bilinear | none | int wt_uq_1b[2] = { 0, 16 };
int wt_uq_2b[4] = { 0, 5, 11, 16 };
int wt_uq_3b[8] = { 0, 2, 5, 7, 9, 11, 14, 16 };
int wt_uq_4b[16] = { 0, 1, 2, 3, 4, 5, 6, 7, 9, 10, 11, 12, 13, 14, 15, 16 };

| wctl | bits/qwt | # qwts | shape | name | step 2 | step 3 |
|---|---|---|---|---|---|---|
| 000b | | | | | | |
| 001b | 2 | 16 | grid | 2_1 | none | none |
| 010b | 4 | 8 | 50% ckbd | 4_2_H | none | plus filter horizontal |
| 011b | 4 | 8 | 50% ckbd | 4_2_H | none | vertical filter |
| 100b | 3 or 4 | 4, 5, or 6 | 50% partitioned | 4_2_V PART_4x2 | none | none |
| 101b | 3 or 4 | 4, 5, or 6 | partitioned | PART_2x4 | none | none |
| 110b | 4 | 8 | 2x4 grid | 2Y_4X | bilinear | none |
| 111b | 4 | 8 | 4x2 grid | 4Y_2X | bilinear | none |

FIG. 4A

```
wctl    Bit Layout
----    ----------
000b    [bit 31 ...                                              ... bit 0]
are [1:0] w33 w32 w31 w30 w23 w22 w21 w20 w13 w12 w11 w10 w03 w02 w01 w00    // all 001b    [bit 31 ...                                   ... bit 0]
are [3:0] w33 w31 w22 w20 w13 w11 w02 w00                                    // all
010b    ditto
011b    ditto x=2..3  [bit 31 ...                        ... bit 16]
100b    w2[2:0] w1[2:0] w0[2:0]  3-partition[5:0]  1                         // for
        w1[3:0] w0[3:0]          2-partition[5:0]  0 1
        w3[3:0]                  4-partition[5:0]  0 1 0                     // note
w3 here x=0..1  [bit 15 ...                        ... bit 0]
101b    ditto                                                                // for
y=2..3  ditto                                                                // for y=0..1
110b    [bit 31 ...                                              ... bit 0]
are [3:0] w7 w6 w5 w4 w3 w2 w1 w0                                            // all
111b    ditto
```

[bit 31 ... bit 0]
w33 w32 w31 w30 w23 w22 w21 w20 w13 w12 w11 w10 w03 w02 w01 w00    // all are [1:0]

[bit 31 ... bit 0]
w33 w31 w22 w20 w13 w11 w02 w00    // all are [3:0]

FIG. 4E

```
[bit 31 ...      ... bit 0]
 w33 w31 w22 w20 w13 w11 w02 w00    // all are [3:0]
```

```
[bit 15 ...                 ... bit 0]
2-partition[5:0]   w1[3:0]  w0[3:0]   0 0
4-partition[5:0]   w1[3:0]  w0[3:0]   1 0
3-partition[5:0]   w1[2:0]  w0[2:0]   0 1   // note w3 here
```

FIG. 4K

```
100b                              101b
0 0 1 1 1                  0 0 0 0 0              0 0 0 0 0
of qwt[31:16]              0 0 1 1 1              0 1 1 1 1
   0 0 1 1 1               0 0 1 1 1              1 1 1 1 1
   0 0 1 1 1               0 0 1 1 1              1 1 1 1 1
```

// 0 marks the location of qwt[15:0] and 1 the location

[bit 31 ....:.. bit 0]
w7[3:0] w6[3:0] w5[3:0] w4[3:0] w3[3:0] w2[3:0] w1[3:0] w0[3:0]

```
[bit 31 ...    ... bit 0]
 w7 w6 w5 w4 w3 w2 w1 w0            // all are [3:0]
```

| wctl | bits/qwt | # qwts | shape | name | step 2 | step 3 |
|---|---|---|---|---|---|---|
| 000b | 1 | 32 | grid | 1_1 | none | none |
| 001b | 2 | 16 | 50% ckbd | 2_2 | none | plus filter horizontal |
| 010b filter | 2 | 16 | 50% ckbd | 2_2_H | none | vertical filter |
| 011b | 2 or 4 | 16 | 50% partitioned | PART_4x4 | none | none |
| 100b | 3 | 4, 5, or 6 | grid | 4_4 | none | ecks. |
| 101b horizontal, vertical filters | 4 | 8 | 2x4 grid | 2Y_4X | bilinear | none |
| 110b | 4 | 8 | 4x2 grid | 4Y_2X | bilinear | none |
| 111b | 4 | 8 | | | | |

FIG. 5A

```
wct]  Bit Layout
----  ----------
000b  [bit 31 ...                                                            ... bit 0]
      w37 w35 w33 w31 w26 w24 w22 w20 w17 w15 w13 w11 w06 w04 w02 w00        // all
      are [1:0]
010b  ditto
011b  ditto 001b  [bit 31 ...                                                            ... bit 0]
      w37 w36 w35 w34 w33 w32 w31 w30 w27 w26 w25 w24 w23 w22 w21 w20
      w17 w16 w15 w14 w13 w12 w11 w10 w07 w06 w05 w04 w03 w02 w01 w00
      are 1b

[bit 31 ....                   ... bit 16]
x=4..7  100b        2-partition[5:0]  w1[3:0]  w0[3:0]                       // for
                    4-partition[5:0]  w3[3:0]  w0[3:0]                       // note
w3 here                               w1[2:0]  w0[2:0]  0  0
                    3-partition[5:0]  w1[2:0]  w0[2:0]  0  1
                                                              1 x=0..3              [bit 15 ...                                 ... bit 0]
        ditto 101b    [bit 31 ...                                                          ... bit 0]
        w26 w24 w22 w20 w05 w04 w02 w00                                      // all
        are [3:0]

110b    [bit 31 ...                                                          ... bit 0]
        w7[3:0] w6[3:0] w5[3:0] w4[3:0] w3[3:0] w2[3:0] w1[3:0] w0[3:0]
111b    ditto
```

FIG. 5B

```
[bit 31 ...                                                              ... bit 0]
w37 w36 w35 w34 w33 w32 w31 w30 w27 w26 w25 w24 w23 w22 w21 w20 ...  // all are 1b
w17 w16 w15 w14 w13 w12 w11 w10 w07 w06 w05 w04 w03 w02 w01 w00
```

```
[bit 31 ...                                                              ... bit 0]
w37 w35 w33 w31 w26 w24 w22 w20 w17 w15 w13 w11 w06 w04 w02 w00  // all are [1:0]
```

```
[bit 31 ...                              ... bit 0]
w37 w35 w33 w31 w26 w24 w22 w20 w17 w15 w13 w11 w06 w04 w02 w00   // all are [11:0]
```

```
[bit 31]                                                  [bit 0]
w37 w35 w33 w31 w26 w24 w22 w20 w17 w15 w13 w11 w06 w04 w02 w00   // all are [1:0]
```

FIG. 5I

```
100b
qwt[31:16]  0 0 0 0 1 1 1 1        // 0 marks the location of qwt[15:0] and 1 the location of
            0 0 0 0 1 1 1 1
            0 0 0 0 1 1 1 1
            0 0 0 0 1 1 1 1
```

```
[bit 31 ...                         bit 0]
w26 w24 w22 w20 w06 w04 w02 w00     // all are [3:0]
```

```
[bit 31 :.: bit 0]
w7[3:0] w6[3:0] w5[3:0] w4[3:0] w3[3:0] w2[3:0] w1[3:0] w0[3:0]
```

FIG. 5Q $$\text{out\_wrt} = (\text{wa} * \text{ma} + \text{wb} * \text{mb} + \text{wc} * \text{mc} + \text{wd} * \text{md} + 16) >> 5$$

FIG. 5U out_wt = (w0 * 6 + w2 * 5 + w1 * 12 + w3 * 9 + 16) >> 5

FIG. 5V

[bit 31 ... bit 0]
w7[3:0] w6[3:0] w5[3:0] w4[3:0] w3[3:0] w2[3:0] w1[3:0] w0[3:0]

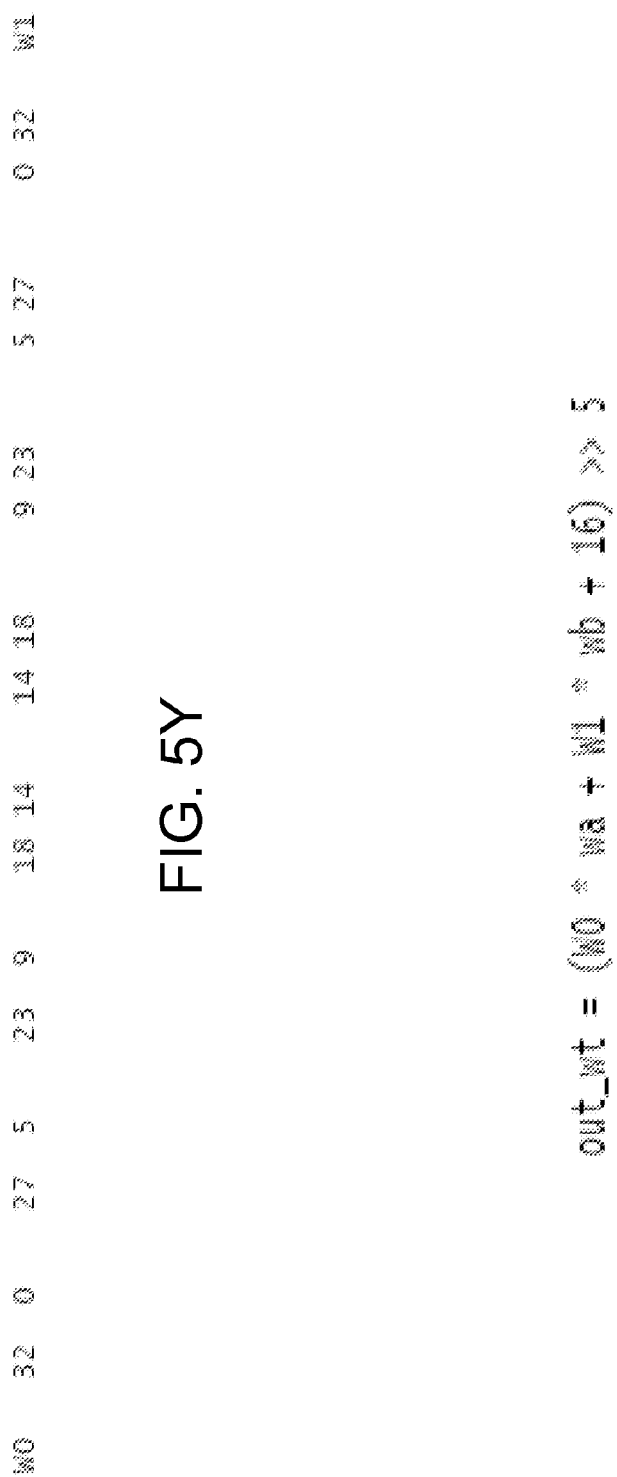

| wctl | bits/qwt | # qwts | shape | name | step 2 | step 3 |
|---|---|---|---|---|---|---|
| 000b | 2 horizontal, vertical filters | 16 | — | — | — | — |
| 001b | 1 | 32 | grid | 2_4 | none | ecks, |
| 010b | 1 | 32 | 50% ckbd | 1_2_H | none | plus filter horizontal |
| 011b | 1 | 32 | 50% ckbd | 1_2_H | none | vertical filter horizontal |
| filter 100b | 3 or 4 | 4, 5, or 6 | 50% ckbd | 1_2_V | none | vertical filter |
| 101b | 3 or 4 | 4, 5, or 6 | partitioned | PART_8x4 | none | horizontal |
| filter 110b | 4 | 8 | partitioned | PART_4x8 | none | none |
| 111b | 4 | 8 | 2x4 grid | 2Y_4X | bilinear | none |
|  | 4 | 8 | 4x2 grid | 4Y_2X | bilinear | none |

FIG. 6A

```
Wctl    Bit Layout
----    ----------
000b    [bit 31 ... bit 0]
all are w66 w64 w62 w60 w46 w44 w42 w40 w26 w24 w22 w20 w06 w04 w02 w00
[1:0]

001b    [bit 31 ... bit 0]
        w77 w75 w73 w71 w66 w64 w62 w60 w57 w55 w53 w51 w46 w44 w42 w40
all are w37 w35 w33 s31 w26 w24 w22 w20 w17 w15 w13 w11 w06 w04 w02 w00
1b 010b    ditto
011b    ditto ... bit 16]
for x=2,3
100b    2-partition[5:0]          w4[3:0] w0[3:0]   0 0
        4-partition[5:0]          w3[3:0] w0[3:0]   0 1 0
note w3                                             1 0
here    3-partition[5:0]  w2[2:0] w1[2:0] w0[2:0]   1

... bit 0]
for x=0,1
        [bit 15 ...  ...  bit 0]
        ditto 101b    ditto 110b    [bit 31 ...  ... bit 0]
        w7 w6 w5 w4 w3 w2 w1 w0
all are [3:0]
111b    ditto
```

FIG. 6B

[bit 31 ... bit 0]
w66 w64 w62 w60 w46 w44 w42 w40 w26 w24 w22 w20 w06 w04 w02 w00  // all are
[1:0]

```
[bit 34 ...                                      ... bit 0]
w77 w75 w73 ... w57 w55 w53 w51 ... w15 w13 w11 ...
w37 w35 w33 s31 ... w17 w15 w13 w11 ... w06 w04 w02 w00   // all are
1b                                              w46 w44 w42 w40 ...
```

FIG. 6E $$w00 + w11 \cdot x + w02 \cdot x + w13 \cdot x + w04 \cdot x + w15 \cdot x + w06 \cdot x + w17 \cdot x = y$$
$$w20 + w31 \cdot x + w22 \cdot x + w33 \cdot x + w24 \cdot x + w35 \cdot x + w26 \cdot x + w37 \cdot x = y$$
$$w40 + w51 \cdot x + w42 \cdot x + w53 \cdot x + w44 \cdot x + w55 \cdot x + w46 \cdot x + w57 \cdot x = y$$
$$w60 + w71 \cdot x + w62 \cdot x + w73 \cdot x + w64 \cdot x + w75 \cdot x + w66 \cdot x + w77 \cdot x = y$$

```
[bit 31 :                                                    ... bit 0]
w77 w75 w73 w71 w66 w64 w62 w60 w57 w55 w53 w51 w46 w44 w42 w40 ...
w37 w35 w33 s31 w26 w24 w22 w20 w17 w15 w13 w11 w06 w04 w02 w00 ...
1b                                                                      // all are
```

FIG. 6H

| w | w | w | w | w | w | w | w | |
|---|---|---|---|---|---|---|---|---|
| w00 | -   | w11 | -   | w02 | -   | w13 | -   |   |
| -   | w20 | -   | w31 | -   | w22 | -   | w33 |   |
| w40 | -   | w51 | -   | w42 | -   | w53 | -   |   |
| -   | w60 | -   | w71 | -   | w62 | -   | w73 |   |

| w04 | w15 | -   | w06 | w17 | - | y |
|-----|-----|-----|-----|-----|---|---|
| w24 | -   | w35 | w26 | -   | w37 | y |
| w44 | w55 | -   | w46 | w57 | - | y |
| w64 | -   | w75 | w66 | -   | w77 | y |

(Figures are rotated 90°.)

```
[bit 31 ...                                                    ... bit 0]
w77 w75 w73 w71 w66 w64 w62 w60 w57 w55 w53 w51 w46 w44 w42 w40 ...
w37 w35 w33 w31 w26 w24 w22 w20 w17 w15 w13 w11 w06 w04 w02 w00
1b                                                                        // all are
```

```
[bit 15 ...              ... bit 0]
2-partition[5:0]   w0[3:0]   0 0
4-partition[5:0]   w0[3:0]   1 0
3-partition[5:0]   w1[3:0]   0 1
                   w3[3:0]
                   w1[2:0]
w2[2:0]            w0[2:0]          // note w3 here
```

[bit 31 ........bit 0]
w7[3:0] w6[3:0] w5[3:0] w4[3:0] w3[3:0] w2[3:0] w1[3:0] w0[3:0]

FIG. 6O w0 . . . . . . . w2 . . . . . . . w4 . . . . . . . w6
 .  . . . . . .  .  . . . . . . .  .  . . . . . . .  .
 .  . . . . . .  .  . . . . . . .  .  . . . . . . .  .
 .  . . . . . .  .  . . . . . . .  .  . . . . . . .  .
 .  . . . . . .  .  . . . . . . .  .  . . . . . . .  .
 .  . . . . . .  .  . . . . . . .  .  . . . . . . .  .
 .  . . . . . .  .  . . . . . . .  .  . . . . . . .  .
w1 . . . . . . . w3 . . . . . . . w5 . . . . . . . w7

FIG. 6P out_wt = (wa * wa + wb * wb + wc * wc + wd * wd + 16) >> 5

FIG. 6R

| wa | wb |
|----|----|
| wa | wc |
|    | wd |

FIG. 6S

| 10 | 4 |
| 13 | 5 |

| w2 | w4 | wa | wb |
| w3 | w5 | wc | wd |

FIG. 6T out_wt = (w2 * 10 + w4 * 4 + w3 * 13 + w5 * 5 + 16) >> 5

FIG. 6U

FIG. 6X out_wt = (wa * wa + wb * wb + wc * wc + wd * wd + 16) >> 5

FIG. 6Z-2 out_wt = (w2 * 5 + w3 * 4 + w4 * 13 + w5 * 10 + 16) >> 5

FIG. 6Z-1 out_chan = (base_chan[ ] * 16 + weight * delta_chan[ ] + 8) >> 4

FIG. 7A out_chan = base_chan[ ] * 16 + weight * delta_chan[ ]

FIG. 7B

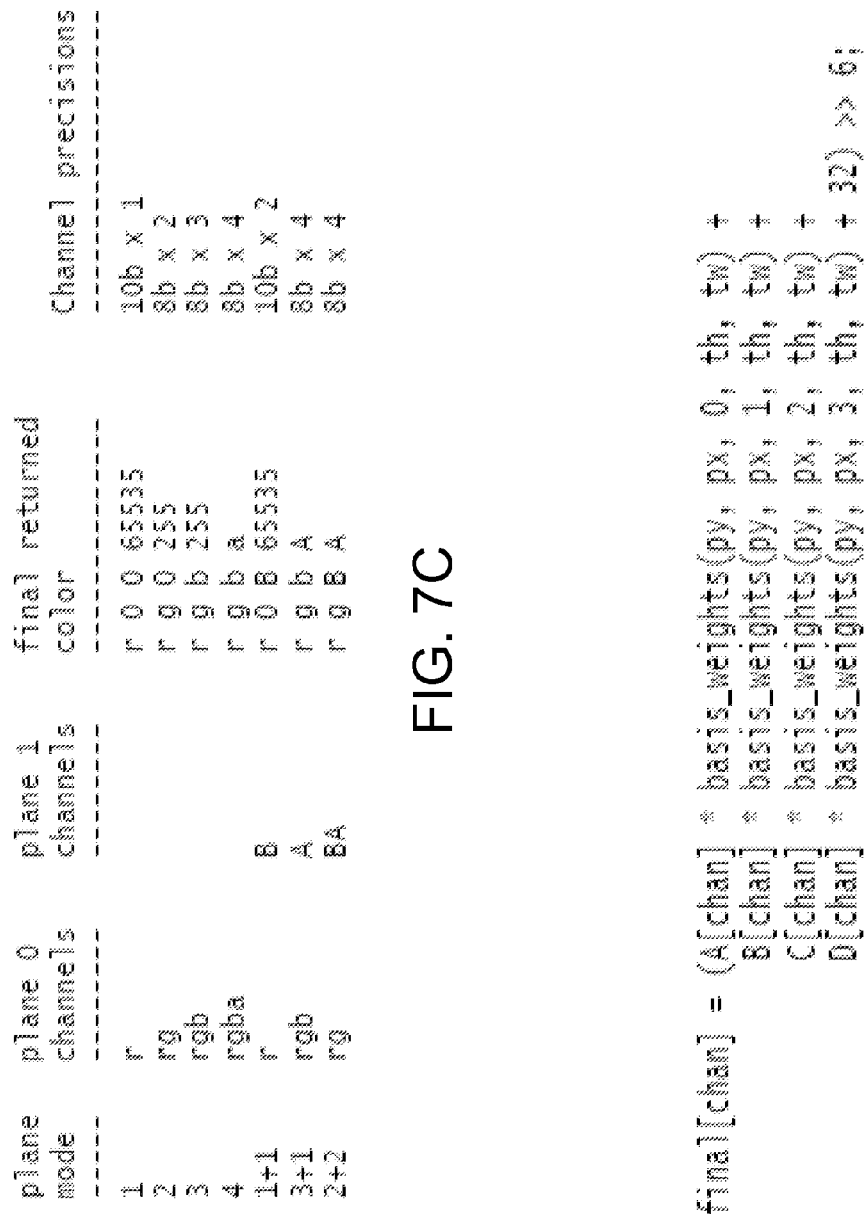

```
out[chan] = A[chan] * basis_weights(py, px, 0, th, tw) +
            B[chan] * basis_weights(py, px, 1, th, tw) +
            C[chan] * basis_weights(py, px, 2, th, tw) +
            D[chan] * basis_weights(py, px, 3, th, tw) +
            (out[chan] >> 10);

final[chan] = out[chan] + (out[chan] >> 8) >> 4;
```

FIG. 7E

```
static int basis_weights(int py, int px, int index, int th, int tw)
{
    if ((index&1)==0) px = tw-px;
    if ((index&2)==0) py = th-py;
    return px * py * (8/tw) * (8/th);
}
```

| | | | | | | | |
|---|---|---|---|---|---|---|---|
| 0: 0011<br>0011<br>0221<br>2222 | 1: 0001<br>0011<br>2211<br>2221 | 2: 0000<br>2001<br>2211<br>2211 | 3: 0222<br>0022<br>0011<br>0111 | 4: 0000<br>0000<br>1122<br>1122 | 5: 0011<br>0011<br>0022<br>0022 | 6: 0022<br>0022<br>1111<br>1111 | 7: 0011<br>0011<br>2211<br>2211 |
| 8: 0000<br>0000<br>1111<br>2222 | 9: 0000<br>1111<br>1111<br>2222 | 10: 0000<br>1111<br>2222<br>2222 | 11: 0012<br>0012<br>0012<br>0012 | 12: 0112<br>0112<br>0112<br>0112 | 13: 0122<br>0122<br>0122<br>0122 | 14: 0011<br>0112<br>1122<br>1222 | 15: 0011<br>2001<br>2200<br>2220 |
| 16: 0001<br>0011<br>0112<br>1122 | 17: 0111<br>0011<br>2001<br>2200 | 18: 0000<br>1122<br>1122<br>1122 | 19: 0022<br>0022<br>0022<br>1111 | 20: 0111<br>0111<br>0222<br>0222 | 21: 0001<br>0001<br>2221<br>2221 | 22: 0000<br>0011<br>0122<br>0122 | 23: 0000<br>1100<br>2210<br>2210 |
| 24: 0122<br>0122<br>0011<br>0000 | 25: 0012<br>0012<br>1122<br>2222 | 26: 0110<br>1221<br>1221<br>0110 | 27: 0000<br>0110<br>1221<br>1221 | 28: 0022<br>1102<br>1102<br>0022 | 29: 0110<br>0110<br>2002<br>2222 | 30: 0011<br>0122<br>0122<br>0011 | 31: 0000<br>2000<br>2211<br>2221 |
| 32: 0000<br>0002<br>1122<br>1222 | 33: 0222<br>0022<br>0012<br>0011 | 34: 0011<br>0012<br>0022<br>0222 | 35: 0120<br>0120<br>0120<br>0120 | 36: 0000<br>1111<br>2222<br>0000 | 37: 0120<br>1201<br>2012<br>0120 | 38: 0120<br>2012<br>1201<br>0120 | 39: 0011<br>2200<br>1122<br>0011 |
| 40: 0011<br>1122<br>2200<br>0011 | 41: 0101<br>0101<br>2222<br>2222 | 42: 0000<br>0000<br>2121<br>2121 | 43: 0022<br>1122<br>0022<br>1122 | 44: 0022<br>0011<br>0022<br>0011 | 45: 0220<br>1221<br>0220<br>1221 | 46: 0101<br>2222<br>2222<br>0101 | 47: 0000<br>2121<br>2121<br>2121 |
| 48: 0101<br>0101<br>0101<br>2222 | 49: 0222<br>0111<br>0222<br>0111 | 50: 0002<br>1112<br>0002<br>1112 | 51: 0000<br>2112<br>2112<br>2112 | 52: 0222<br>0111<br>0111<br>0222 | 53: 0002<br>1112<br>1112<br>0002 | 54: 0110<br>0110<br>0110<br>2222 | 55: 0000<br>0000<br>2112<br>2112 |
| 56: 0110<br>0110<br>2222<br>2222 | 57: 0022<br>0011<br>0011<br>0022 | 58: 0022<br>1122<br>1122<br>0022 | 59: 0000<br>0000<br>0000<br>2112 | 60: 0002<br>0001<br>0002<br>0001 | 61: 0222<br>1222<br>0222<br>1222 | 62: 0101<br>2222<br>2222<br>2222 | 63: 0111<br>2011<br>2201<br>2230 |

| FIRST INDEX VALUE 0 | x |
|---|---|
| THIRD INDEX VALUE 1 | f(x,y) = 2/3(x) + 1/3(y) |
| FOURTH INDEX VALUE 2 | f(x,y) = 1/3(x) + 2/3(y) |
| SECOND INDEX VALUE 3 | y |

METHOD AND SYSTEM FOR INTERPOLATING INDEX VALUES OF ASSOCIATED TILES IN AN IMAGE

CROSS REFERENCE TO RELATED APPLICATIONS

This application claims priority to and the benefit of U.S. Provisional Application No. 61/509,405, entitled "ZIL3-FIXED BLOCK SIZE IMAGE COMPRESSION FOMAT AT 1 BPP, 2 BPP, 4 BPP,", with filing date 19 Jul. 2011, which is herein incorporated by reference in its entirety.

BACKGROUND

An image includes color information that is displayed on a two-dimensional array of pixels. The pixels are divided into tiles of the image. Color and/or texture information related to the pixels within a tile are stored in a block of memory. The image can be encoded (compressed) to reduce its size so that the image can be efficiently stored in memory. The stored information is then accessed, where it can be decoded (decompressed), reconstructed, and displayed.

An image's true color is typically rendered as 32 bits per pixel, wherein eight bits are assigned to each of the red, green, blue, and alpha (transparency) components. However, the cost of storing true color information for each of the pixels in an image is prohibitively high. In part, to keep the cost and required space reasonable, the memory included in image rendering systems is designed to store a finite amount of information that is smaller than the amount associated with the true information related to one or more images.

Additionally, the bandwidth required for rendering images is of concern. Transferring true color information (e.g., 32 bits for each pixel) for pixels in an image would require large amounts of bandwidth between the memory and the image renderer. For real-time images and videos, this bandwidth requirement is impossible to meet without increasing circuit layouts thereby increasing the size and cost of the image renderer.

One solution to the limited memory and bandwidth requirements is to compress and/or encode the true color information for an image, and to store the compressed data within memory. Thereafter, the compressed data is decoded (decompressed), reconstructed, and displayed. Proper implementation of compression and decompression methods is desired for lossless storage and display of images.

SUMMARY

A method for performing indexing in an image decoder is disclosed. The method includes identifying a tile in an image, wherein the image comprises a plurality of tiles, and wherein each tile includes color data associated with a plurality of pixels. The method includes asymmetrically providing a plurality of indices throughout the tile. The method includes identifying a pixel in the tile. The method also includes determining a corresponding rectangular grid that includes the pixel, wherein the corresponding rectangular grid comprises four indices. The method includes determining an index for the pixel by bilinearly filtering the group of four indices that is associated with the corresponding rectangular grid, wherein the filtering is performed in relation to the pixel.

In some embodiments, a system includes a tangible, non-transitory computer-readable storage medium having stored thereon, computer-executable instructions that, when executed causes the computer system to perform a method for performing indexing in an image decoder is disclosed. The method includes identifying a tile in an image, wherein the image comprises a plurality of tiles, and wherein each tile includes color data associated with a plurality of pixels. The method includes asymmetrically providing a plurality of indices throughout the tile. The method includes identifying a pixel in the tile. The method also includes determining a corresponding rectangular grid that includes the pixel, wherein the corresponding rectangular grid comprises four indices. The method includes determining an index for the pixel by bilinearly filtering the group of four indices that is associated with the corresponding rectangular grid, wherein the filtering is performed in relation to the pixel.

In other embodiments, a codec or image decoder is configured to perform a method for performing indexing. The method includes identifying a tile in an image, wherein the image comprises a plurality of tiles, and wherein each tile includes color data associated with a plurality of pixels. The method includes partitioning a rectangular grid into a first index value and a second index value configured in a specified pattern. The method includes applying the rectangular grid to the tile for purposes of determining index values for pixels in the tile.

In some embodiments, a computer-readable medium having computer-executable instructions stored thereon for performing a method of indexing is disclosed. The method includes identifying a tile in an image, wherein the image comprises a plurality of tiles, and wherein each tile includes color data associated with a plurality of pixels. The method includes partitioning a rectangular grid into a first index value and a second index value configured in a specified pattern. The method includes applying the rectangular grid to the tile for purposes of determining index values for pixels in the tile.

Thus, according to embodiments of the present disclosure index information is interpolated between one or more index values of a rectangular grid covering a tile to obtain color information for a pixel. Moreover, partitioning of two or more index values into a configuration of a specified pattern for a rectangular grid provides index values to obtain color information.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 2A illustrates a table that specifies the channels being compressed by plane n, in accordance with one embodiment of the present disclosure.

FIG. 2B illustrates a table that lists global modes, in accordance with one embodiment of the present disclosure.

FIGS. 3A-D show bit ordering for plane_modes, in accordance with embodiments of the present disclosure.

FIG. 3E illustrates a table that specifies all possible bit precisions used for each channel for each plane mode, in accordance with one embodiment of the present disclosure.

FIG. 3F illustrates a table that specifies which channels come from which qvals as a function of plane_mode, in accordance with one embodiment of the present disclosure.

FIGS. 3G-H are examples of channel values as a function of plane_mode, in accordance with one embodiment of the present disclosure.

FIG. 3I illustrates a function that unquantizes all value pairs except for plane_mode=4, channel 3, in accordance with one embodiment of the present disclosure.

FIG. 3J illustrates a function for scaling to 0..255, in accordance with one embodiment of the present disclosure.

FIG. 3K is a function used to unquantize in a channel 3 plane_mode=4 case, in accordance with one embodiment of the present disclosure.

FIGS. 3L-N are tables illustrating 4×4, 4×8, and 8×8 weight formats, respectively, in accordance with embodiments of the present disclosure.

FIG. 3O illustrates tables used to unquantize quantized weights, in accordance with one embodiment of the present disclosure.

FIGS. 3P-T are illustrations of using filtering (e.g., horizontal, vertical plus, and ecks) to determine weight and index values, in accordance with one embodiment of the present disclosure.

FIGS. 4A-S are illustrations detailing weight decompression for 4×4 weight formats, in accordance with embodiments of the present disclosure.

FIGS. 7A-F are illustrations detailing per-block color computation, in accordance with one embodiment of the present disclosure with embodiments of the present disclosure.

FIG. 16 is a table Listing sixty-four two-index value partitions, in accordance with one embodiment of the present disclosure.

FIG. 17 is a table listing sixty-four three-index value partitions, in accordance with one embodiment of the present disclosure.

FIG. 18 is a table illustrating how third and fourth index values are determined from first and second index values, in accordance with one embodiment of the present disclosure.

FIG. 19 is a table listing sixty-four three-index value partitions, in accordance with one embodiment of the present disclosure.

DETAILED DESCRIPTION

Figure 1:
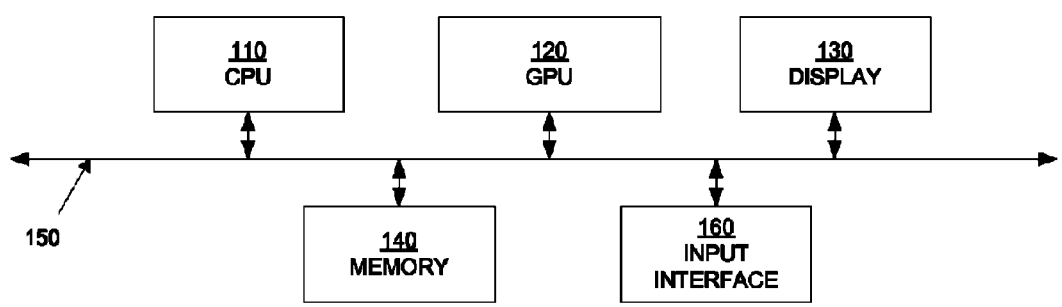
FIG. 1 depicts a block diagram of an exemplary computer system suitable for implementing the present methods in accordance with one embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "identifying," "determining," "quantizing," "delta encoding," "partitioning," "applying," "providing," or the like, refer to actions and processes (e.g., flowcharts 1000 and 1500 of FIGS. 1000 and 1500, respectively) of a computer system or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

Figure 10:
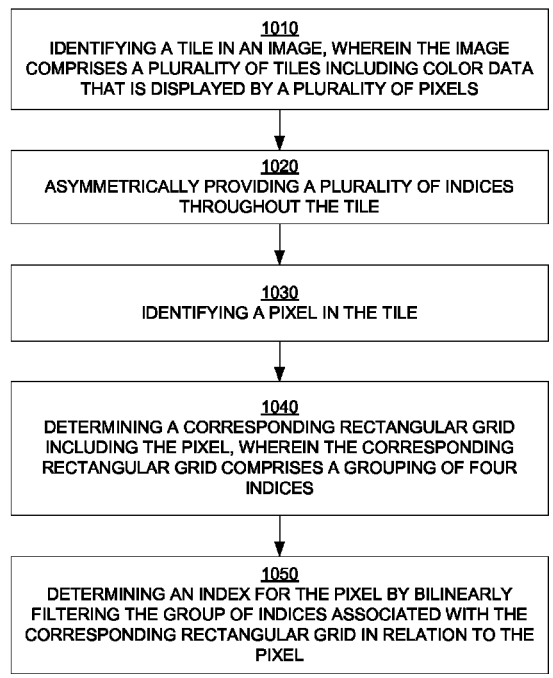
FIG. 10 is a flow diagram depicting a computer implemented method for determining an index value for purposes of determining a color value for a pixel in an image, in accordance with one embodiment of the disclosure.
Figure 15:
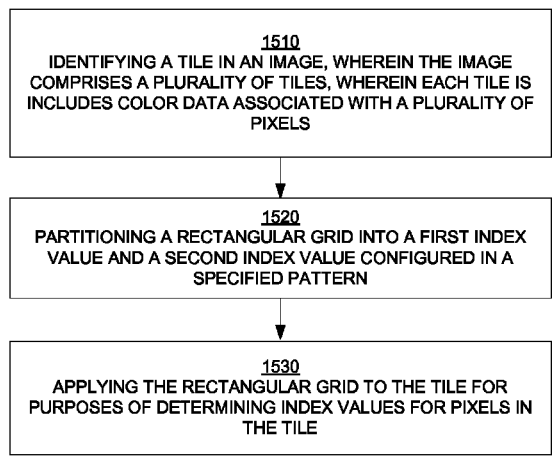
FIG. 15 is a flow diagram depicting a computer implemented method for indexing in an image decoder, in accordance with one embodiment of the present disclosure.

FIGS. 10 and 15 are flowcharts of examples of computer-implemented methods for processing data according to embodiments of the present invention. Although specific steps are disclosed in the flowcharts, such steps are exemplary. that is, embodiments of the present invention are well-suited to performing various other steps or variations of the steps recited in the flowcharts.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

In the discussion that follows, unless otherwise noted, a "codec" refers to an element (e.g., a stand-alone or peripheral device, or an integrated system) that performs both encoding and decoding. For instance, "coding," unless otherwise noted, refers to basic encoding operations (e.g., interpolation, quantization, delta encoding, least significant bit compression, etc.), while "decoding" refers to basic decoding operations (e.g., reverse quantization, delta decoding, least significant bit decompression, etc.). One or more "tiles" refers to an array of pixels (e.g., N×N array), wherein each tile is associated with a "block" of memory that stores information used for rendering color and/or textures of a pixel in the corresponding tile. The term "pixel" refers to a location in two-dimensional screen space.

In embodiments of the present disclosure, systems and methods are described in which compression and decompression of index values are performed to store and display color and/or texture information for a pixel in an image. Advantages of embodiments of the present invention include the decompression of pixel information based on an asymmetric distribution of indices throughout a tile. Still other advantages include the partitioning of two or more index values into a configuration of a specified pattern for a rectangular grid that provides index values for purposes of determining color and/or texture information. Still other advantages of embodiments of the present invention include the compression and decompression of tile information that are performed for images of arbitrary size, and not just powers of two sizes.

FIG. 1 is a block diagram of an example of a computing system 100 capable of implementing embodiments of the present disclosure. Computing system 10 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 110 and a system memory 140.

Both the central processing unit (CPU) 110 and the graphics processing unit (GPU) 120 are coupled to memory 140. System memory 140 generally represents any type or form of volatile or non-volatile storage device or medium capable of storing data and/or other computer-readable instructions. Examples of system memory 140 include, without limitation, RAM, ROM, flash memory, or any other suitable memory device. In the example of FIG. 1, memory 140 is a shared memory, whereby the memory stores instructions and data for both the CPU 110 and the GPU 120. Alternatively, there may be separate memories dedicated to the CPU 110 and the GPU 120, respectively. The memory can include a frame buffer for storing pixel data drives a display screen 130.

The system 100 includes a user interface 160 that, in one implementation, includes an on-screen cursor control device. The user interface may include a keyboard, a mouse, and/or a touch screen device (a touchpad).

CPU 110 and/or GPU 120 generally represent any type or form of processing unit capable of processing data or interpreting and executing instructions. In certain embodiments, processors 110 and/or 120 may receive instructions from a software application or hardware module. These instructions may cause processors 110 and/or 120 to perform the functions of one or more of the example embodiments described and/or illustrated herein. For example, processors 110 and/or 120 may perform and/or be a means for performing, either alone or in combination with other elements, one or more of the identifying, determining, quantizing, reverse quantization, delta encoding, and delta decoding, described herein. Processors 110 and/or 120 may also perform and/or be a means for performing any other steps, methods, or processes described and/or illustrated herein.

The computer-readable medium containing the computer program may be loaded into computing system 100. All or a portion of the computer program stored on the computer-readable medium may then be stored in system memory 140 and/or various portions of storage devices. When executed by processors 110 and/or 120, a computer program loaded into computing system 100 may cause processor 110 and/or 120 to perform and/or be a means for performing the functions of the example embodiments described and/or illustrated herein. Additionally or alternatively, the example embodiments described and/or illustrated herein may be implemented in firmware and/or hardware.

Compression Formatting

ZIL-3 is a 1 bit per pixel (bpp), 2 bpp, or 4 bpp fixed block size format that uses 64 bits (64b) or 128b per block to compress RGB and RGBA images of 8 bits per channel, in one embodiment. ZIL-3 uses three different tile sizes: 4×4, 4 high×8 wide, or 8×8, depending on the bpp and number of channels per plane chosen.

To decompress a pixel, the four nearest blocks to a pixel are used to compute four colors, which are then weighted and accumulated to form a final color. The different ZIL3 formats are controlled by the ZIL3 global modes: plane_mode, bpp, and is_wrapped. These global modes apply to the decompression of a single image, or mipmap pyramid, etc. A different image may have different global modes. Global modes apply to all blocks of an image and are passed to the hardware decompressor as texture state.

The plane mode specifies how many channels are compressed per plane. Typically, a plane will usually compress channels well if they are correlated. Which channels are decompressed to for each mode is fixed. It is intended that the application use the texture instruction swizzle as needed to move the data into the correct final channels. The allowable plane_modes are: 1, 2, 3, 4, 1+1, 3+1, and 2+2.

FIG. 2A illustrates a table 200A, wherein "plane n channels" specifies the channels being compressed by plane n, in accordance with one embodiment of the present disclosure. Also, 0 or 255 are inserted as appropriate in the final returned color whenever the total number of channels compressed is less than 4.

The bpp, global mode specifies the bits per pixel. The allowable bpp values include 1, 2, and 4.

The is_wrapped, global mode is either true or false. If true, then when decompressing the edges of the image, blocks from the other edge of the image are used. The mechanism is identical to texturing "wrap" versus "clamp" mode; is_wrapped=true is the same as "wrap" and false is the same as "clamp."

FIG. 2B illustrates a table 200B that lists global modes, in accordance with one embodiment of the present disclosure. There are a total of 36 ZIL-3 global modes of concern to the decoder, wherein each of the X's in the table 200B can have is_wrapped true or false. The number of different formats visible to the API, though, is twice that (72) because plane_modes 1 and 1+1 also have UNORM16 and SNORM16 modes, and the other plane_modes have UNORM8 and UNORM8 SRGB modes.

Figures 2C, 2D:
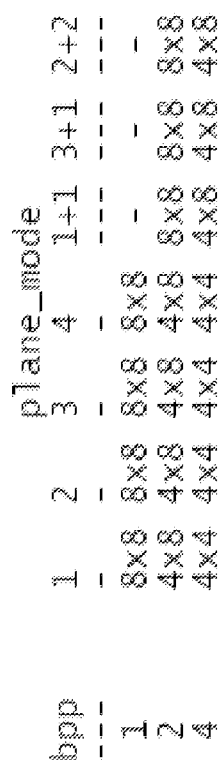
FIG. 2C illustrates a table that lists tile size as a function of bpp and plane_mode, in accordance with one embodiment of the present disclosure.
FIG. 2D illustrates an equation for computing locations of a block of a given pixel, in accordance with one embodiment of the present disclosure.

FIG. 2C illustrates a table 200C that lists tile size as a function of bpp and plane_mode, in accordance with one embodiment of the present disclosure.

A compressed image may be any size; it is not limited to dimensions that are a power of two. Given an image of dimensions w wide and h high, and tile width tw, the height th, the image dimensions in blocks is bw=MAX(2, (w+tw−1)/tw); bh=MAX(2, (h+th−1)/th), where the division is an integer division; 3/2=1 for example. All divisions in this specification are integer divisions. The relationship between non-negative image coordinates [row,col]=[iy, ix] and block coordinates is provided as follows: (bx=ix/tw); (bxx=ix % tw); (by=iy/th); and (byy=iy % th). In the relationship, bxx and byy are the coordinates of the image pixel within the block, with [byy, bxx]=[0,0] being the upper left pixel of the block. [iy,ix]=[0, 0] is the upper left pixel of the image.

The blocks used to decompress the pixel at [iy,ix] are located at [by0,bx0]. [by1,bx1], which is always at most 4 different blocks, in one embodiment. The values bx0 and bx1 can be computed by the equation shown in FIG. 2D, in accordance with one embodiment of the present disclosure. The computation for by0 and by1 is similar, wherein in the equation of FIG. 2D, y is substituted for x, th for tw, and bh for bw. In the worst case, up to 9 blocks will need to be read to decompress a 2×2 quad of pixels for an image. This worst case occurs only if is_wrapped is true, the 2×2 quad of pixels are mapped to the four corners of the image (due to texture wrapping, for example) and the image dimensions are a multiple of the tile dimensions plus half a tile or more.

The ZIL-3 block size is 64b or 128b and is 128b aligned. Bit 0 of the block is the least significant bit of byte 0 of the block, bit 7 of the block is the most significant bit of byte 0 of the block; that pattern continues until bit 127, which is the most significant bit of byte 15 of the block. A ZIL-3 block consists of compressed quantized values, compressed quantized weights, value control bits, and weight control bits, but not necessarily in that order.

To decompress a pixel, the 4 nearest blocks to the pixel are determined. Then, for each block, its weights and values are decompressed, giving a base and delta value and weight. Colors are computed based on the base and delta values. Four weights are determined based on the pixel's location, and the four colors are accumulated with these weights to determine the final decompressed color.

In particular, the weight decompression process consists of unquantizing some number of weights, distributing these weights across the tile in several different ways, and interpolating (in several different ways) within and across the tile to fill in any missing weights. The final weight value computed per pixel is in the range 0 . . . 16 (which represents a scaled value in the range 0.0 . . . 1.0.)

The value decompression process consists of unquantizing directly to a base and delta value for each of the four channels RGBA. After unquantization, base channels are in the range 0 . . . 255 and delta channels in the range −255 . . . 255.

Four tiles give four (base, delta) pairs for the pixel being interpolated. The interpolated weight is used to compute four interpolated colors from these four pairs, using an expression of the form base+delta*weight/16. Finally, a table lookup is performed which assigns weights to each of the four interpolated colors. Each color is multiplied by its assigned weight and accumulated, giving the final decompressed color for the pixel.

The following discusses in detail how values are uncompressed, how weights are uncompressed, how weights are interpolated, and the final accumulation of channels.

In the ZIL-3 block format, three are four different bit orderings for ZIL-3 blocks, depending on plane_mode. For the following discussion, the following fields are defined, as follows:

"qwts0, qwts1"—wherein these bits store the compressed weights for the tile, 0 for plane 0 and 1 for plane 1.

"wctl0, wctl1"—wherein these bits select one of 8 different weight compression schemes. The weights are effectively compressed at 0.5 bpp, 1 bpp, or 2 bpp. There are a total of 24 different schemes defined for weight compression.

"qvals0, qvals1"—wherein these bits store the compressed values for the tile (e.g., base and delta values).

"vctl0, vctl1"—wherein these bits control the two or eight ways the base and delta values are compressed. Three bits are used for vctl only for plane_mode=4.

FIGS. 3A-D show bit ordering for plane_modes, in accordance with embodiments of the present disclosure. Specifically, FIG. 3A shows bit ordering for plane_modes=1, 2, or 3. FIG. 3B shows bit ordering for plane_mode=4. FIG. 3C shows bit ordering for plane_mode=1+1 or 2+2. FIG. 3D shows bit ordering for plane_mode 3+1. In this ordering, qvals0 is 42b in size. Also, bits [41:28] are stored in qvals0 hi, and bits [27:0] are stored in qvals0_lo.

For purposes of value decompression, compressed values occupy 26, 28, or 42 bits. One to four channels are stored in those bits. There are two value pairs stored for each channel. A value pair v0, v1 is stored as (v0, (v1−v0) & mask). For some v0, v1 pairs, it is possible to use a smaller number of bits to store the (v1−v0) & mask portion. In that case, the bits saved are used to represent v0 more accurately.

For example, assume 10 bits are available to store a value pair v0, v1. The values v0 and v1 can be quantized to 5 bits each and stored. But suppose v0 and v1 are quantized to 6 bits each, such that 45 and 59 are achieved, respectively. Storing (45, (59−45) & 0xF) is storing (45, 14), which also fits in 10 bits. When this proves to be possible, that channel (and value pair) is called "squeezed." In one implementation, the number of mask bits is 10−6=4.

One squeezed bit applies to one to three channels; only when all channels of a qval can be squeezed will any channel be squeezed. The alpha channel in plane_mode=4 is squeezed independently. For plane_mode=4, two additional vctl bits are used to optimize for cases where the alpha value is 255.

FIG. 3E illustrates a table 300E that specifies all possible bit precisions used for each channel for each plane mode, in accordance with one embodiment of the present disclosure. The bits are for v1,v0, respectively. That is, "6,8" means 8 bits are used to store the quantized value for v0 and 6 bits are used to store the (v1−v0)&mask result. The left_sq column applies to the leftmost n channels in the plane_mode n+m, and the right_sq column applies to the rightmost m channels. ch3 in plane_mode=4 is unquantized specially. A 0 precision means that a 255 is returned as the unquantized value.

Table 300E illustrates which output channels are generated when the block is decompressed. The unspecified channels in Table 300E are set to 0 for channels 2 and 3, and either 255 or 65535 for channel 3, wherein the larger value is for 1 and 1+1 plane_modes. (See the table 200A in FIG. 2A). In one implementation, for plane_modes 1 and 1+1, there are 9 and 18 unused bits, respectively, in the compression format. These bits are ignored by the decoder, and are required to be set to zero by the encoder.

FIG. 3F illustrates a table 300F that specifies which channels come from which qvals as a function of plane_mode, in accordance with one embodiment of the present disclosure. As shown in Table 300F, the value bits are stored in qvals in channel order; channel 0 first, and up to channel 3, with v0 first and then v1. Any unused bits are in the higher-order bits. For example, plane_mode=1, (ch0=10,10) gives results provided in FIG. 3G as the content of qvals0[27:0], in one embodiment. For that mode, vctl0 is also unused. As another example, plane_mode=4, vctl0=2 gives (for the precisions listed: 3,0; 3,4; 4,5; and 3,4), as provided in FIG. 3H, in one embodiment.

FIG. 3I illustrates a function 300I that unquantizes all value pairs except for plane_mode=4, channel 3, in accordance with one embodiment of the present disclosure. In the above, bit_replicate (v, vp) scales v (in the range 0 . . . 2^vp−1) to 0 . . . 255.

Also, FIG. 3J illustrates a function 300J for scaling to 0 . . . 255, in accordance with one embodiment of the present disclosure. For the 1 and 1+1 plane_modes, the 10 bit value stored is used as is (the unquantization occurs in the final step, after accumulation, as further described below. For other plane_modes, no quantization (and thus no unquantization) occurs when the channel is 8 bits in size.

For the channel 3 plane_mode=4 case, the following function 300K as illustrated in FIG. 3K is used to unquantize, in one embodiment, wherein this is the ch3_sq case. In the above, the scaling is simpler since v is in the range 0.2^vp, with the value 2^vp not stored but indicated by vp==0.

For purposes of weight decompression, there are 3 different weight formats, each with 3 wctl bits, for a maximum of 24 formats. An M×N weight format decompresses 32b of compressed weights to a M×N tile of weights in the range 0 . . . 16. In the following discussion, "qwt" means "quantized weight." For the meaning of the steps, see the discussion below.

FIG. 3L is a table 300L illustrating 4×4 weight formats, in accordance with one embodiment of the present disclosure. FIG. 3M is a table 300M illustrating 4×8 weight formats, in accordance with one embodiment of the present disclosure. FIG. 3N is a table 300N illustrating 8×8 weight formats, in one embodiment.

More particularly, exact weight decompression details are provided below. For purposes of determining weight validity and availability, the process of decompressing the one or two weights for a pixel takes three steps. First, the quantized weights are extracted from one or both subweights and unquantized. Second, some or all of the weights in the chunk are computed from the weights that were unquantized. At this point, the weights that have been computed are considered the "valid" weights. Finally, any remaining missing weights are interpolated from adjacent weights that are both valid and available. A weight is "available" if it came from the pixel's block. If the weight is in an adjacent block, the weight is available if is_wrapped is true, or the adjacent block is spatially adjacent.

For purposes of weight unquantization, quantized weights are stored in 1 to 4 bits. Tables shown in FIG. 3O are used to unquantize these bits, in accordance with one embodiment of the present disclosure.

Computing weights varies depending on the tile size and the wctl weight control. This is further described in detail below. At the end of this step, some or all of the weights in the tile are present. The ones that are not present are invalid weights, which need step 3 to be computed. Weights that are present after step 2 are "valid" weights.

For purposes of weight filtering, missing (i.e., invalid) weights are computed by filtering adjacent valid and available weights. As shown in FIG. P, only the immediate 8 neighbors of an invalid weight (shown as ".") are ever used for filtering, in one embodiment.

There are four filters used: "horizontal (−)", "vertical (|)", "plus (+)", and "ecks (x)." The filter to use is determined solely from the Wctl value and the pixel position of the invalid weight. The symbols above (−|+x) is used to specify the filter at each pixel position. By construction, there will always be at least one valid and available weight for any filter. Each filter adds up its valid and available weights and returns the rounded average.

Weight filtering always looks beyond the block boundary for valid and available weights, in one embodiment. Recall that if is_wrapped is false, weights beyond the blocks on the image border are defined as not available.

In one embodiment, weight filtering can go outside the image, since there can be valid weights in a block that are outside the image. In particular, weights in the same block as the pixel being decompressed are always available. Note that weights more than 1 pixel away from the image border are never used.

Weight filtering always occurs in a single plane, in one embodiment. That is, when plane_mode is 1+1, 2+2, or 3+1, the plane 0 weights are filtered with adjacent plane 0 weights, and ditto for plane 1.

FIG. 3Q is an illustration of horizontal filtering for determining an invalid weight, in accordance with one embodiment of the present disclosure. This filter only looks at neighbors W and E, as shown in FIG. 3Q. the filter returns W, E, or (W+E+1)/2.

Figure 3R:

FIG. 3R is an illustration of vertical filtering for determining an invalid weight, in accordance with one embodiment of the present disclosure. This filter only looks at neighbors N and S. This filter will return N, S, or (N+S+1)/2.

Figure 3S:

FIG. 3S is an illustration of plus filtering, in accordance with one embodiment of the present disclosure. This plus filter only looks at neighbors N, E, W, and S. This filter will return (N+E+1)/2, (W+S+1)/2, (W+E+1)/2, (N+S+1)/2, (N+W+E+1)/3, (N+W+S+1)/3, (N+E+S+1)/3, (W+E+S+1)/3, or (N+W+E+S+2)/4. There are no other possibilities, since the other cases are eliminated because some weights are always valid.

Figure 3T:
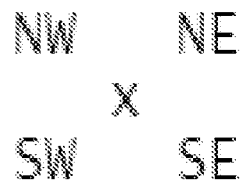

FIG. 3T is an illustration of ecks filtering, in accordance with one embodiment of the present disclosure. This ecks filter only looks at neighbors NW, NE, SW, and SE. The ecks filter returns NW, (NW+NE+1)/2, (NW+SW+1)/2, or (NW+NE+SW+SE+2)/4. There are no other possibilities.

FIGS. 4, 5 and 6 are illustrations detailing weight decompression for all formats, in accordance with embodiments of the present disclosure. In particular, FIGS. 4A-S are illustrations detailing weight decompression for 4×4 weight formats, in accordance with embodiments of the present disclosure. FIGS. 5A-Z are illustrations detailing weight decompression for 4×8 weight formats, in accordance with embodiments of the present disclosure. FIGS. 6A-Z are illustrations detailing weight decompression for 8×8 weight formats, in accordance with one embodiment of the present disclosure.

FIGS. 4A-S are illustrations detailing weight decompression for 4×4 weight formats. In particular, FIG. 4A provides 4×4 weight formatting, in accordance with one embodiment of the present disclosure. FIG. 4B provides bit locations within the weight bits (e.g., qwts0 or qwts1), in accordance with one embodiment of the present disclosure. In FIG. 4B, the two digit form wmn corresponds to the pixel at block offset y=m, x=n. Thus, w00 is the upper left pixel and w33 is the lower right pixel. The single digit form wi corresponds variables that are processed differently as a function of the value of wctl. All of the w's above are quantized weights, which are unquantized to the final 0 . . . 16 range.

FIG. 4C refers to the case where wctl=000b, in accordance with one embodiment of the present disclosure. For wctl=000b, the sixteeen 2b quantized weights wij are unquantized to Wij=wt_uq_2b[wij] and placed at locations (filling the tile) shown in FIG. 4D. there is no filtering step for this format, in one embodiment.

FIG. 4E refers to the case where wctl=001b, in accordance with one embodiment of the present disclosure. The eight 4b quantized weights wij are unquantized to Wij=wt_uq_4b[wij] and placed at locations in the tile (forming a checkerboard) shown in FIG. 4F, in one embodiment. The invalid weights are computed using the "plus" filter. At most, the valid and available weights at locations w, x, y, and z outside the block are needed for the filtering step.

FIG. 4G refers to the case where wctl=010b, in accordance with one embodiment of the present disclosure. The eight 4b quantized weights wij are unquantized to Wij=wt_uq_4b[wij] and placed at the locations in the tile (forming a checkerboard) shown in FIG. 4H, in one embodiment. The invalid weights are computed using the "horizontal" filter. At most, the valid and available weights at locations w and y outside the block are needed for the filtering step.

FIG. 4I refers to the case where wctl=011b, in accordance with one embodiment of the present disclosure. The eight 4b quantized weights wij are unquantized to Wij=wt_uq_4b[wij] and placed at locations in the tile (forming a checkerboard) shown in FIG. 4J, in one embodiment. The invalid weights are computed using the "vertical" filter. At most, the valid and available weights at locations x and z outside the block are needed for the filtering step.

FIG. 4K refers to the case where wctl=100b, 101b, in accordance with one embodiment of the present disclosure. This weight format uses 16b to compress half of the tile. The term "subweight" is used to refer to the 16b compressed weight, and "chunk" to refer to the half of the tile. The chunk size is 4 h×2 w (100b) or 2 h×4 w (101b) for each subweight. There are two subweights, giving a final tile size of 4×4 weights.

Bits [15:0] in the qwt covers the chunk with the lower x (or y for 101b) coordinates, and bits [31:16] in the qwt covers the other chunk, as is shown in FIG. 4L, in one embodiment.

The description below discusses decoding one subweight to a chunk. The bit locations reference the bits within the subweight. Where wctl=100b uses only columns 0 and 2 of the partition table chosen, giving a 4h×2w set of weights. Where wctl=101b uses only rows 0 and 2 of the partition table chosen. This gives a 2h×4w set of weights.

If bit 0 is a 1, the 3 3b wi are unquantized to Wi=wt_uq_3b[wi]. The appropriate subset of the BC7 3-partition table (64 entries) is used to determine where to place W0, W1, and W2: Wi is placed at the i's in the partition table.

If bit 0 is a 0 and bit 1 is a 0, the 2 4b wi are unquantized to Wi=wt_uq_4b[wi]. The appropriate subset of the BC7 2-partition table (64 entries) is used to determine where to place W0 and W1: Wi is placed at the i's in the partition table.

If bit 0 is a 0 and bit 1 is a 1, w0 and w3 are extracted. The two 4b wi are unquantized to Wi=wt_uq_4b[wi]. Two new values W1 and W2 are computed via the Equations in FIG. 4M, in one embodiment.

The appropriate subset of the filtered 4-partition table (64 entries) is used to determine where to place W0 . . . W3: Wi is placed at the i's in the partition table.

There is no filtering step for these formats.

FIG. 4N refers to the case where wctl=110b, in accordance with one embodiment of the present disclosure. The eight 4b quantized weights wi are unquantized to Wi=wt_uq_4b[wi] and placed at the following locations in the tile (forming a 2×4 grid of placed weights), as shown in FIG. 4O, in one embodiment. For the left column, the two missing weights Wyx are shown in FIG. 4P, in one embodiment. For the second row, make the substitutions: W*0→W*1, W0→W2, W1→W3. Similar substitutions are used to compute the third and fourth rows. There is no filtering step for this format.

FIG. 4Q refers to the case where wctl=111b, in accordance with one embodiment of the present disclosure. The eight 4b quantized weights wi are unquantized to Wi=wt_uq_4b[wi] and placed at the following locations in the tile (forming a 4×2 grid of placed weights), as shown in FIG. 4R, in one embodiment. For the top row, the two missing weights Wyz are shown in FIG. 4S, in one embodiment. For the second row, make the substitutions: W0*→W1*, W0→W2, W1→W3. Similar substitutions are used to compute the third and fourth rows. There is no filtering step for this format.

FIGS. 5A-Z are illustrations detailing weight decompression for 4×8 weight formats, in accordance with embodiments of the present disclosure. In particular, FIG. 5A provides 4×8 weight formats, in accordance with one embodiment of the present disclosure. With regards to bit locations, FIG. 5B provides bit locations within the weight bits (e.g., qwts0 or qwts1), in one embodiment. In FIG. 5B, the two digit form wmn corresponds to the pixel at block offset y=m, x=n. Thus, w00 is the upper left pixel and w37 is the lower right pixel. The single digit form wi corresponds to variables that are processed differently as a function of the value of wctl. All of the w's above are quantized weights, which are unquantized to the final 0 . . . 16 range at various points.

FIG. 5C refers to the case where wctl=000b, in accordance with one embodiment of the present disclosure. The thirty-two 1b quantized weights wij are unquantized to Wij=wt_uq_1b[wij] and placed at the following locations (filling the tile), as shown in FIG. 5D, in one embodiment. There is no filtering step for this format.

FIG. E refers to the case where wctl=001b, in accordance with one embodiment of the present disclosure. The sixteen 2b quantized weights wij are unquantized to Wij=wt_uq_2b[wij] and placed at the following locations in the tile (forming a checkerboard), as shown in FIG. 5F, in one embodiment. The invalid weights are computed using the "plus" filter. At most, the valid and available weights at locations x, y, z, and w outside the block are needed for the filtering step.

FIG. 5G refers to the case where wctl=010b, in accordance with one embodiment of the present disclosure. The sixteen 2b quantized weights wij are unquantized to Wij=wt_uq_2b[wij] and placed at the following locations in the tile (forming a checkerboard), as shown in FIG. 5H, in one embodiment. The invalid weights are computed using the "horizontal" filter. At most, the valid and available weights at locations w and y outside the block are needed for the filtering step.

Figure 5J:
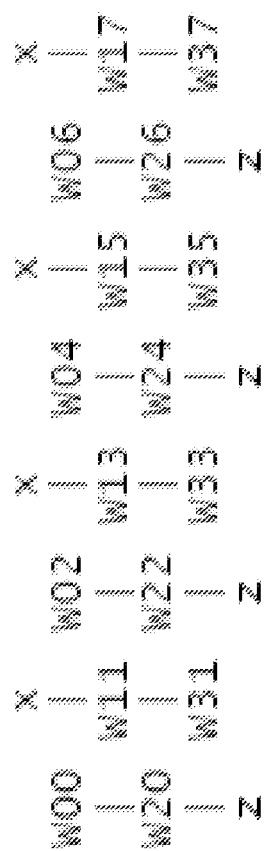
FIGS. 5A-Z are illustrations detailing weight decompression for 4×8 weight formats, in accordance with embodiments of the present disclosure.

FIG. 5I refers to the case where wctl=011b, in accordance with one embodiment of the present disclosure. The sixteen 2b quantized weights wij are unquantized to Wij=wt_uq_2b[wij] and placed at the following locations in the tile (forming a checkerboard), as shown in FIG. 5J, in one embodiment. The invalid weights are computed using the "vertical" filter. At most, the valid and available weights at locations x and z outside the block are needed for the filtering step.

Figure 5K:
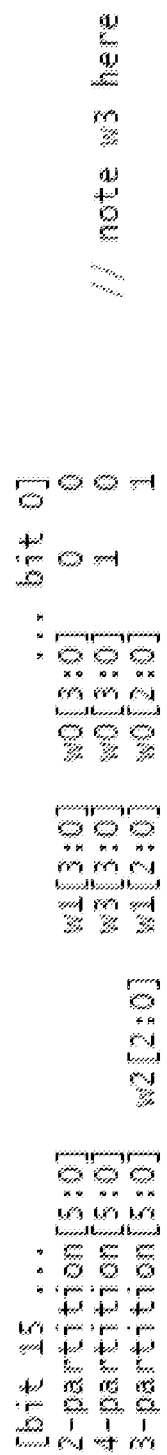

FIG. 5K refers to the case where wctl=100b, in accordance with one embodiment of the present disclosure. This weight format uses 16b to compress half of the tile. The term "subweight" is used to refer to the 16b compressed weight, and "chunk" to refer to the half of the tile. The chunk size is 4×4 for each subweight. There are two subweights, giving a final size of 4×8 weights. Bits [15:0] in the qwt covers the chunk with the lower x coordinates, and bits [31:16] in the qwt covers the other chunk, as shown in FIG. 5L, in one embodiment.

The description below discusses decoding one subweight to a 4×4 chunk. The bit locations reference the bits within the subweight. If bit 0 is a 1, the 3 3b wi are unquantized to Wi=wt_uq_3b[wi]. The BC7 3-partition table (64 entries) is used to determine where to place W0, W1, and W2: Wi is placed at the i's in the partition table.

If bit 0 is a 0 and bit 1 is a 0, the 2 4b wi are unquantized to Wi=wt_uq_4b[wi]. The BC7 2-partition table (64 entries) is used to determine where to place W0 and W1: Wi is placed at the i's in the partition table.

If bit 0 is a 0 and bit 1 is a 1, w0 and w3 are extracted. The 2 4b wi are unquantized to Wi=wt_uq_4b[wi]. Two new values W1 and W2 are computed via the equations in FIG. 5M, in one embodiment.

A new filtered 4-partition table (64 entries) is used to determine where to place W0 . . . W3: Wi is placed at the i's in the partition table. There is no filtering step for this format.

FIG. 5N refers to the case where wctl=101b, in accordance with one embodiment of the present disclosure. For wctl=101b, the eighth 4b quantized weights wij are unquantized to Wij=wt_uq_4b[wij] and placed at the following locations in the tile (forming a grid), as shown in FIG. 5O, in one embodiment. The invalid weights are computed using the "plus" or "ecks" filters, as indicated in the diagram above. Note that the "plus" filters in the interior of the block are equivalent to "horizontal" or "vertical" filters. At most, the valid and available weights at locations a, b, c, d, and e outside the block are needed for the filtering step.

FIG. 5P refers to the case where wctl=110b, in accordance with one embodiment of the present disclosure. The eight 4b quantized weights wi are unquantized to Wi=wt_uq_4b[wi] and placed at the following locations in the tile (forming a 2×4 grid), as shown in FIG. 5Q, in one embodiment. Note that W0, W1, W6, and W7 are used directly; the other 4 weights are located between pixels.

Figures 5R, 5S:

To compute the final weight for a pixel, the table in FIG. 5R and the equation in FIG. 5S are used, in embodiments. The table in FIG. 5R shows the weights used for each of the 4×8 pixels and the four unquantized weights that are nearest to each pixel. For example, the pixel at offset y=2, x=1 from the upper left corner (that is, at coordinates [2,1]) has the numerical weights and the corresponding symbolic weights shown in FIG. 5T, in one embodiment. The 4 nearest unquantized weights to the pixel at [2,1] are, from the above table, shown in FIG. 5U, in one embodiment. So the weight computed for the pixel at offset [2,1] is shown in FIG. 5V, in one embodiment. There is no filtering step for this format.

Figures 5W, 5X:
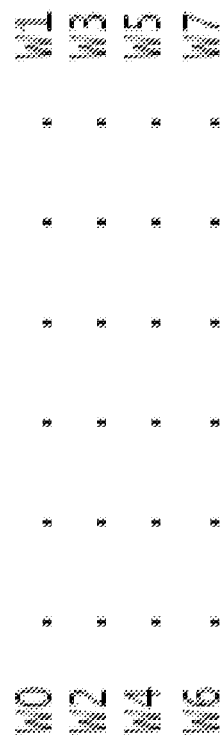

FIG. 5W refers to the case where wctl=111b, in accordance with one embodiment of the present disclosure. The eight 4b quantized weights wi are unquantized to Wi=wt_uq_4b[wi] and placed at the following locations in the tile (forming a 4×2 grid), shown in FIG. 5X, in one embodiment. For the top row in FIG. 5X where y=0, the table in FIG. 5Y and the function in FIG. 5Z are used, in one embodiment. For example, at an offset x=2, the table entry is (23, 9, wa, wb), and the output weight is (out wt=(W0*23+W1*9+16)>>5). For the second row, make the substitutions: W0→W2 and W1→W3. Similar substitutions are used to compute the third and fourth rows. There is no filtering step for this format.

FIGS. 6A-Z are illustrations detailing weight decompression for 8×8 weight formats, in accordance with one embodiment of the present disclosure. In particular, FIG. 6A illustrates a table listing 8×8 weight formats, in one embodiment. FIG. 6B is a table listing bit locations within the weight bits (e.g., qwts0 or qwts1), in one embodiment.

Figures 6C, 6D:
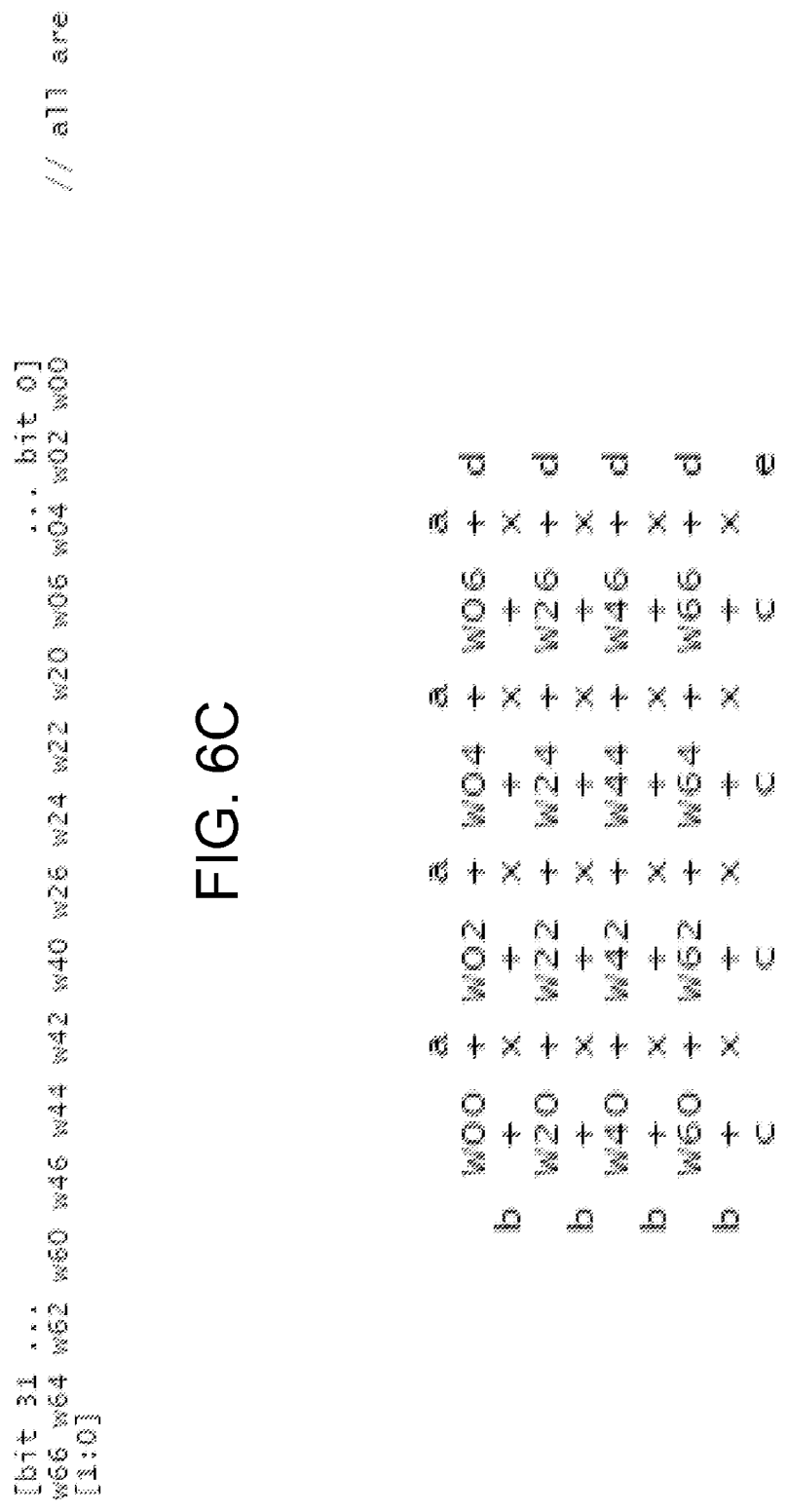

FIG. 6C refers to the case were wctl=000b, in one embodiment. For wctl=000b, the 16 2b quantized weights wij are unquantized to Wij=wt_uq_2b[wij] and placed at the following locations in the tile (forming a grid), as shown in FIG. 6D, in one embodiment. The invalid weights are computed using the "plus" or "ecks" filters, as indicated in the diagram shown in FIG. 6D. Note that the "plus" filters in the interior of the block are equivalent to "horizontal" or "vertical" filters. At most, the valid and available weights at locations a, b, c, d, and e outside the block are needed for the filtering step.

FIG. 6E refers to the case where wctl=001b, in accordance with one embodiment of the present disclosure. The thirty-two 1b quantized weights wij are unquantized to Wij=wt_uq_1b[wij] and placed at the following locations in the tile (forming a checkerboard), shown in FIG. 6F, in one embodiment. The invalid weights are computed using the "plus" filter. At most, the valid and available weights at locations x, y, z, and w outside the block are needed for the filtering step.

FIG. 6G refers to the case where wctl=010b, in accordance with one embodiment of the present disclosure. The thirty-two 1b quantized weights wij are unquantized to Wij=wt_uq_1b[wij] and placed at the following locations in the tile (forming a checkerboard), as shown in FIG. 6H, in one embodiment. The invalid weights are computed using the "horizontal" filter. At most, the valid and available weights at locations w and y outside the block are needed for the filtering step.

Figures 6I, 6J, 6K:
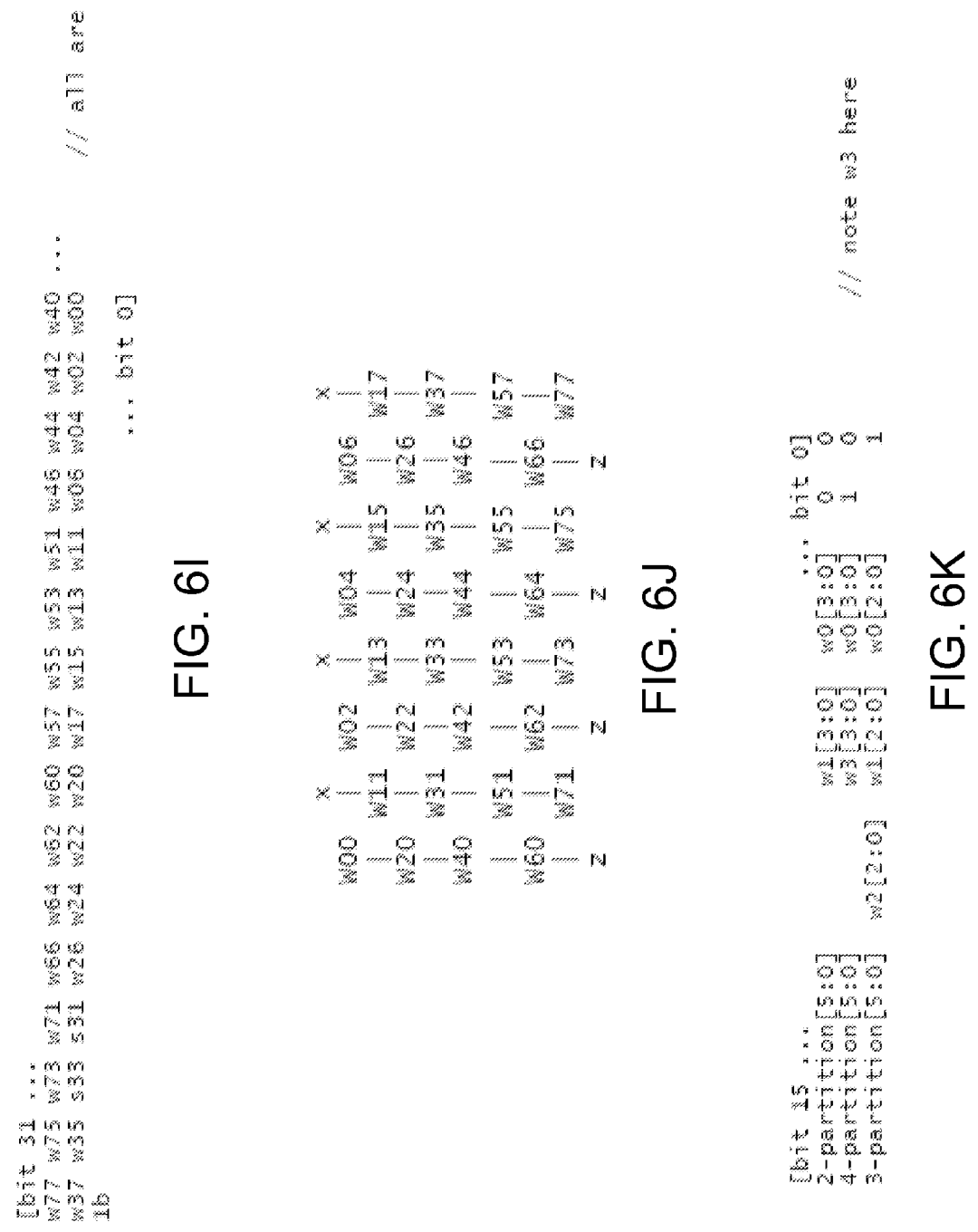

FIG. 6I refers to the case where wctl=011b, in accordance with one embodiment of the present disclosure. The thirty-two 1b quantized weights wij are unquantized to Wij=wt_uq_1b[wij] and placed at the following locations in the tile (forming a checkerboard), as shown in FIG. 6J, in one embodiment. The invalid weights are computed using the "vertical" filter. At most, the valid and available weights at locations x and z outside the block are needed for the filtering step.

Figure 6L:
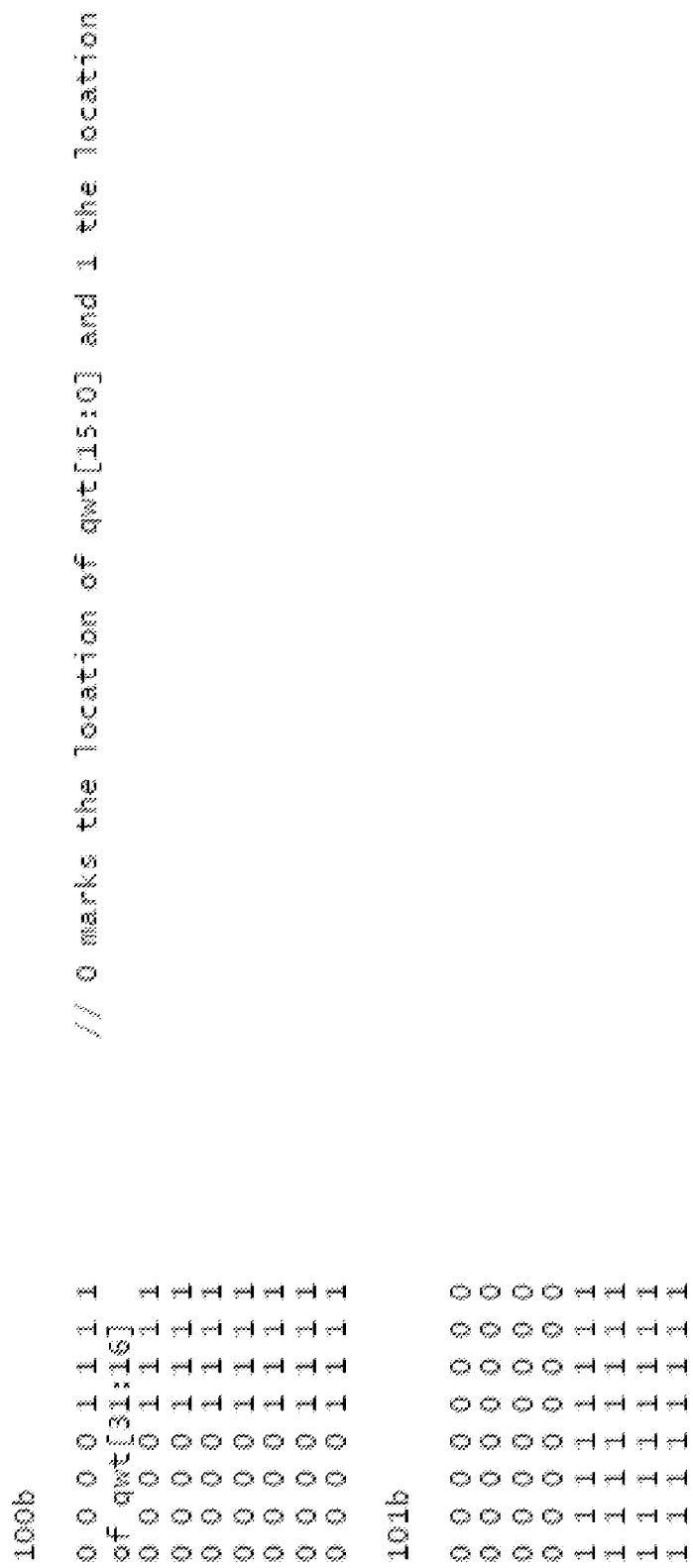
FIGS. 6A-Z are illustrations detailing weight decompression for 8×8 weight formats, in accordance with embodiments of the present disclosure.
Figure 6M:
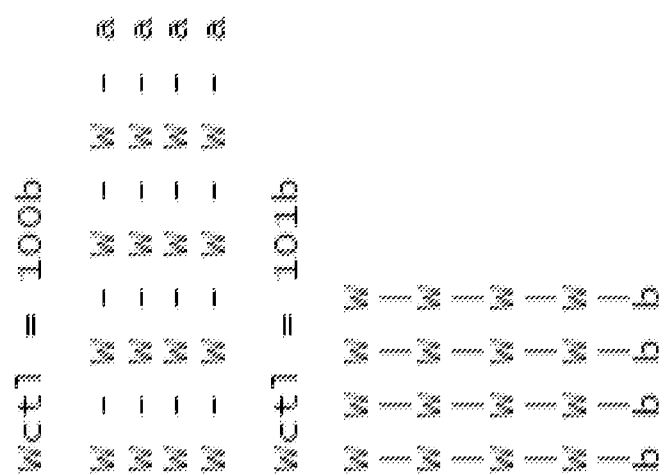

FIG. 6K refers to the case where wctl=100b, and 101b, in accordance with one embodiment of the present disclosure. This weight format uses 16b to compress half of the tile. The term "subweight" is used to refer to the 16b compressed weight, and "chunk" to refer to the half of the tile. The chunk size is 8h×4w (100b) or 4h×8w (101b) for each subweight. There are two subweights, giving a final size of 8×8 weights. Bits [15:0] in the qwt covers the chunk with the lower x (or y for 101b) coordinates, and bits [31:16] in the qwt covers the other chunk, as shown in FIG. 6L, in one embodiment.

The description below discusses decoding one subweight to a 4×8 or 8×4 chunk. The bit locations are the bits within the subweight. Wctl=100b expands the partition table chosen vertically. This gives an 8h×4w set of weights. Wctl=101b expands the partition table chosen horizontally. This gives a 4h×8w set of weights.

Half of the weights are marked as invalid. In the table shown in FIG. 6M, the W's come from the partition table and the invalid weights are filtered as indicated (e.g., "horizontal" for 100b and "vertical" for 101b), in one embodiment.

Note that the weights at a and b outside the block may be required for the filter.

If bit 0 is a 1, the three 3b wi are unquantized to Wi=wt_uq_3b[wi]. The appropriate subset of the BC7 3-partition table (64 entries) is used to determine where to place W0, W1, and W2: Wi is placed at the i's in the partition table.

If bit 0 is a 0 and bit 1 is a 0, the two 4b wi are unquantized to Wi=wt_uq_4b[wi]. The appropriate subset of the BC7 2-partition table (64 entries) is used to determine where to place W0 and W1: Wi is placed at the i's in the partition table.

If bit 0 is a 0 and bit 1 is a 1, w0 and w3 are extracted. The two 4b wi are unquantized to Wi=wt_uq_4b[wi]. Two new values W1 and W2 are computed via the equations in FIG. 6N, in one embodiment.

The appropriate subset of the filtered 4-partition table (64 entries) is used to determine where to place W0 . . . W3: Wi is placed at the i's in the partition table.

FIG. 6O refers to the case where wctl=110b, in accordance with one embodiment of the present disclosure. For wctl=110b, the eight 4b quantized weights wi are unquantized to Wi=wt_uq_4b[wi] and placed at the following logical locations in the tile (forming a 2×4 grid), shown in FIG. 6P, in one embodiment. Note that W0, W1, W6, and W7 are used directly; the other 4 weights are located between pixels.

Figure 6Q:
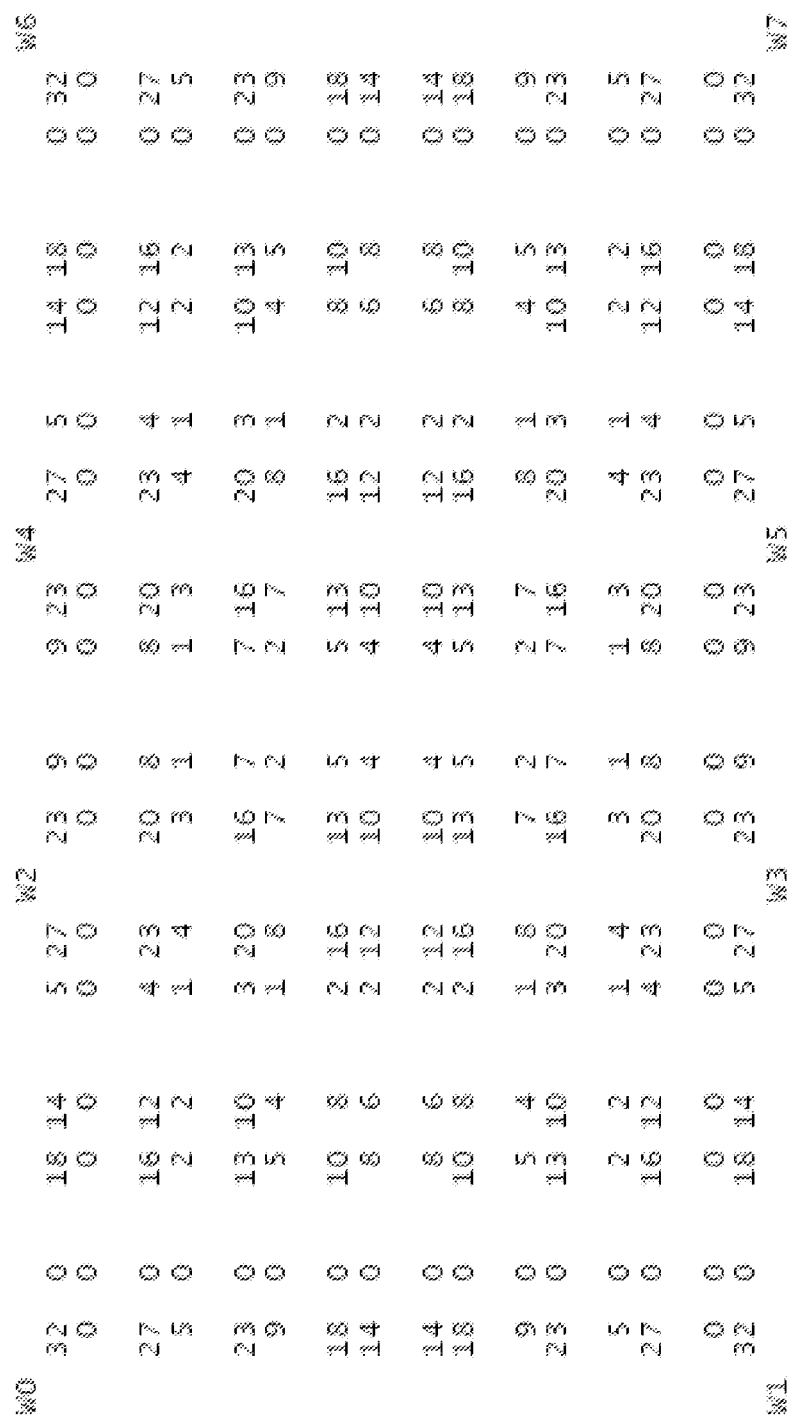

To compute the final weight for a pixel, the table in FIG. 6Q and the equation in FIG. 6R are used, in one embodiment. The table in FIG. 6Q shows the weights used for each of the 8×8 pixels and the four unquantized weights that are nearest to each pixel. For example, the pixel at offset y=4, x=3 (at [4,3]) has the numerical weights and the corresponding symbolic weights shown in FIG. 6S, in one embodiment. The four nearest unquantized weights to the pixel at [4,3] are, from the table of FIG. 6Q is shown in FIG. 6T, in one embodiment. So, the weight computed for the pixel at offset [4,3] is shown in FIG. 6U, in one embodiment. There is no filtering step for this format.

Figures 6V, 6W:

FIG. 6V refers to the case where wctl=111b, in accordance with one embodiment of the present disclosure. The eight 4b quantized weights wi are unquantized to Wi=wt_uq_4b[wi] and placed at the following logical locations in the tile (forming a 4×2 grid) shown in FIG. 6W, in one embodiment. Note that W0, W1, W6, and W7 are used directly; the other 4 weights are located between pixels.

Figure 6X:
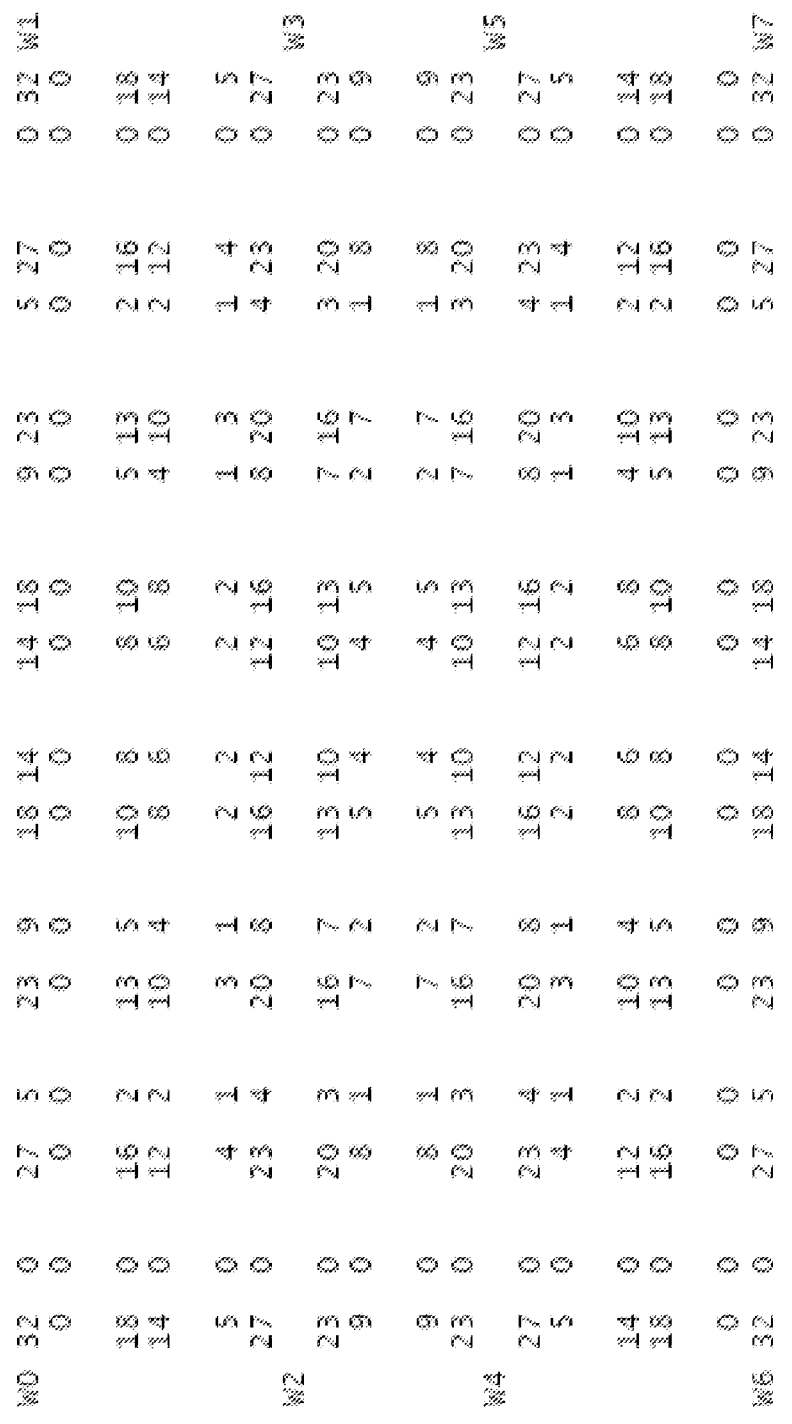

To compute the final weight for a pixel, the table in FIG. 6X and the function in FIG. 6ZY, in one embodiment. The table in FIG. 6X shows the weights used for each of the 8×8 pixels and the four unquantized weights that are nearest to each pixel. Note that the table is the same as the table in FIG. 6Q where wctl=110b, with x and y swapped. For example, the pixel at offset y=4, x=3 (at offset [4,3]) has the numerical weights and the corresponding symbolic weights shown in FIG. 6Z-1, in one embodiment. The four nearest unquantized weights to the pixel at [4,3] are, from the table of FIG. 6X, shown in FIG. 6Z-2, in one embodiment. So the weight computed for the pixel at [4,3] is shown in FIG. 6Z-3, in one embodiment. There is no filtering step for this format.

FIGS. 7A-F are illustrations detailing per-block color computation, in accordance with one embodiment of the present disclosure with embodiments of the present disclosure. In particular, FIG. 7A illustrates an equation for the per-channel computation for plane_modes other than 1 or 1+1, wherein "out is A, B, C, and D, as further described in relation to FIGS. 8A-C. Here, the base range is 0 . . . 255 and the delta range is −255 . . . 255. Also note that the weight above is the weight associated with that channel's plane and generally differs between A, B, C, and D.

For plane_modes 1 and 1+1, the output value per block is computed scaled by 16, as shown in the equation of FIG. 7B, in one embodiment. In the equation of FIG. 7B, the base range is 0 . . . 1023 and the delta range is −1023 . . . 1023. The range for out is then 0 . . . 16368. I is not wider than that because there is an additional constraint that base+delta is also in the range 0 . . . 1023.

The table in FIG. 7C shows the channel precisions used in the per-block color computation as a function of the plane_mode, as well as which channels are computed and which channels use the plane 0 weight and which use the plane 1 weight, in one embodiment.

For purposes of final color accumulation, there are always 4 per-block colors computed. Let [py,px] be the offset of the pixel from the upper left per-block color A. Then, the final decompressed color is computed as follows for plane_modes other than 1 or 1+1, as shown in FIG. 7D, wherein basis_weights( ) returns a value in 0 . . . 64. the arg 0 . . . 3 corresponds to the blocks A, B, C, and D, respectively, in one embodiment. The terms "th" and "tw" are th the height and width, respectively. A and the other colors are in the range 0 . . . 255 per channel.

For plane_modes 1 and 1+1, the final decompressed color is computed as follows in FIG. 7E, in one embodiment. Here, the range of out is 0 . . . 65472. The last shift and add scales that to 0 . . . 65535 which is final's range. One possible implementation of basis_weights( ) is shown in FIG. 7F, in one embodiment.

Figure 8A:
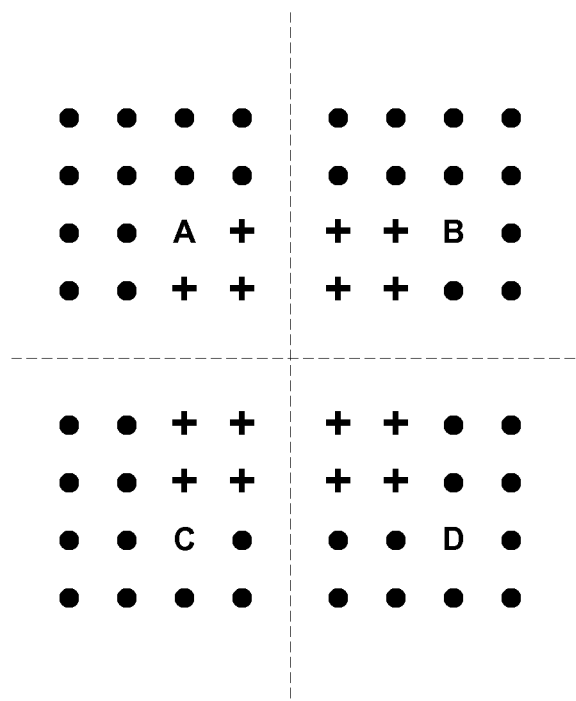
FIG. 8A-C show values that are selected for a pixel, when determining base, delta, and index values, in accordance with embodiments of the present disclosure.
Figure 8B:
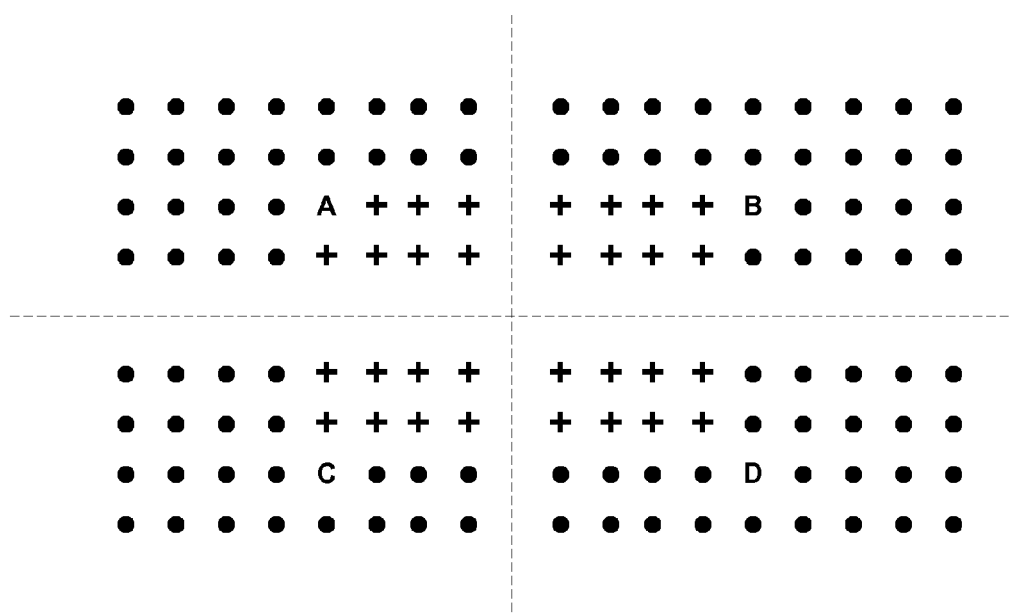
Figure 8C:
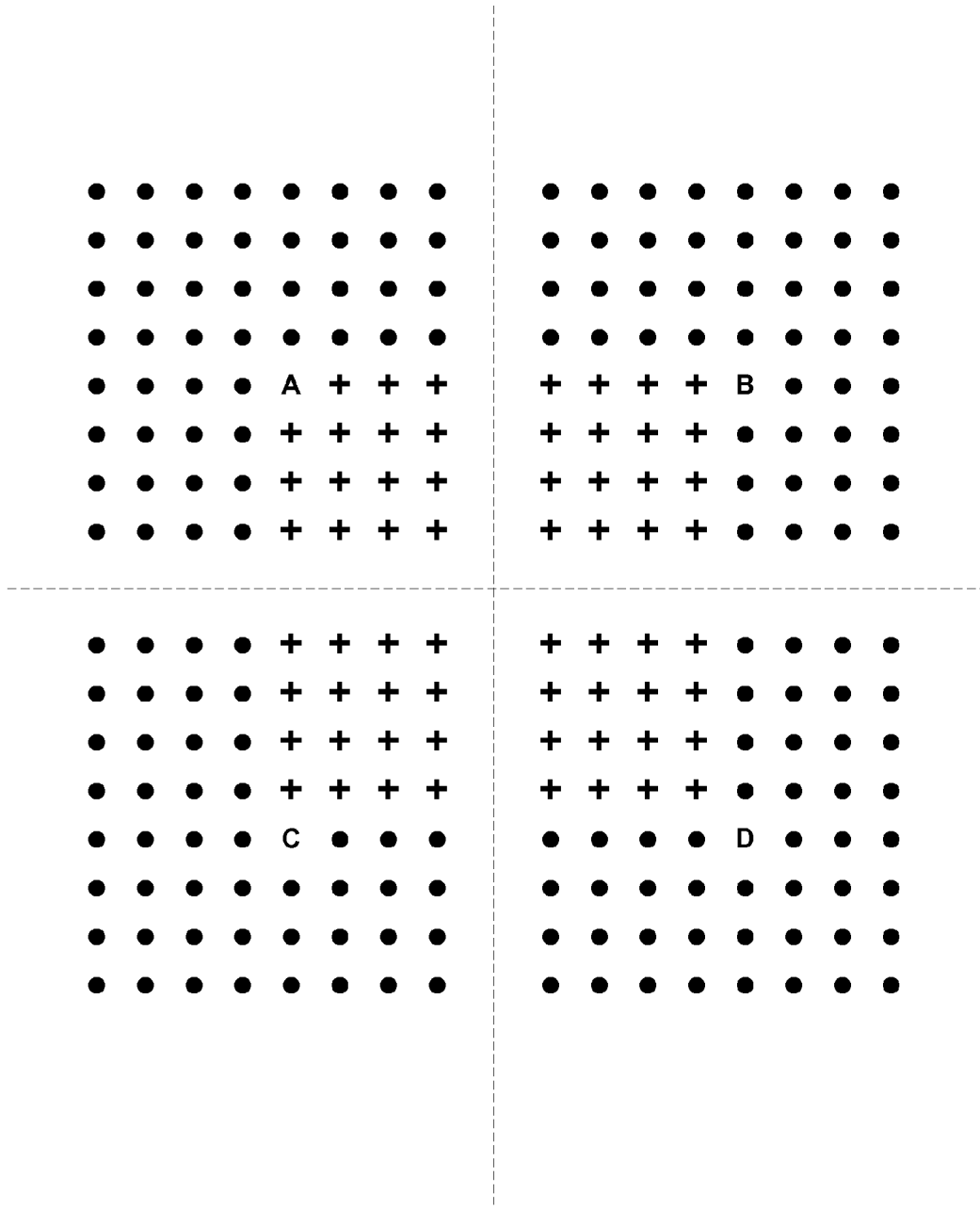

FIG. 8A-C show values that are selected for a pixel, when determining base, delta, and index values, in accordance with embodiments of the present disclosure. The compressed values are located at fixed positions within the corresponding tile. The pixels marked with "+" and "A" use these four blocks. In particular, FIG. 8A illustrates value locations for 4×4 tiles, in one embodiment. Also, FIG. 8B illustrates value locations for 4×8 tiles, in one embodiment. FIG. 8C illustrates value locations for 8×8 tiles, in one embodiment.

Index Interpolation

Figure 9:
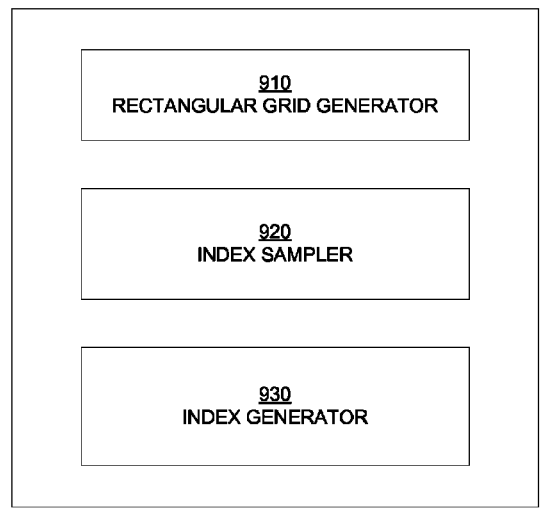
FIG. 9 is a block diagram of an image coder/decoder (codec) configured to render images, in accordance with one embodiment of the present disclosure.

FIG. 9 is a block diagram of an index renderer 900 as part of an image coder/decoder (codec) configured to render images, in accordance with one embodiment of the present disclosure. In general, the coder is configured to compress color and/or texture information for pixels of an image for storage. The decoder is configured to receive the compressed color and/or texture information, decode the information, and produce a displayable image. More particularly, the index renderer 900 is configured to determine an index value for a pixel for purposes of color rendering.

Index renderer 900 is configured to determine and/or interpolate one or more indices for a tile of an image based on previously determined base and delta values. In general, for each pixel in a tile, a color value is determined based on the base and delta values that is weighted by an index value corresponding to the pixel. Specifically, index renderer 900 includes a rectangular grid generator 910 for identifying a tile in an image, wherein the image comprises a plurality of tiles. Each tile in the image includes color data that are associated with a plurality of pixels. Generator 910 also orients the rectangular grids to cover the tile and/or tiles. Index renderer 900 includes an index sampler 920 for providing a plurality of indices of weighting values for each of the rectangular grids. For purposes of compression, index values may be determined through bi-linear interpolation for pixels that are not initially associated with an index value through sampling. Index renderer 900 also includes an index generator 930 that is configured to determine a corresponding rectangular grid for a given pixel. Index generator 930 is also configured to determine an index value for the given pixel by bilinearly filtering a group of indices that is associated with the corresponding rectangular grid. The filtering is performed in relation to the pixel.

Embodiments of the present invention provide for one or more fix-block size texture compression formats. For instance, 1, 2, and 4 bits/pixel (bpp) formats are supported for compressing red, green, and blue (RGB) and red, green, blue, and alpha (RGBA) images of uncompressed 8 bits per channel. At a high level, an image is decompressed by up-sampling base, delta, and index image information. For purposes of the present application, a texel provides color and texture information for a representative pixel on a display. Also, a texture is defined by its dimensions, a set of format selectors, and blocks defining the texels based on the format selected. A compressed texture may be of any size. That is, textures are not limited to dimensions that are a power of two, in one embodiment. In another embodiment, textures are not limited to an integer multiple of the block size.

FIG. 10 is a flow diagram 1000 depicting a computer implemented method for indexing in an image decoder, in accordance with one embodiment of the present disclosure. The operations performed by flow diagram 1000 are implemented by the index renderer 900 as illustrated in FIG. 9, in one embodiment.

At 1010, a tile in an image is identified. The image comprises a plurality of tiles, wherein each tile includes color and/or texture data that is associated with a plurality of pixels. Each tile is associated with a base value, a delta value, and a plurality of indices, wherein the indices provide weighting information for pixels in the tile. For instance, corresponding base, delta and index values are used for determining color and/or texture information for a pixel in the corresponding tile.

At 1020, the method includes asymmetrically providing a plurality of indices throughout the tile. As examples, FIGS. 11A-F are illustrations of asymmetric M×N grids providing layouts of the distribution of index values throughout a tile, in accordance with embodiments of the present disclosure. Each M×N grid of indices is expanded to fit the tile. The asymmetric M×N grids provided in FIGS. 11A-F are provided for illustration purposes and are not intended to limit the scope of the invention as other numerical M×N grid dimensions are supported in other embodiments of the present disclosure.

Figure 11A:
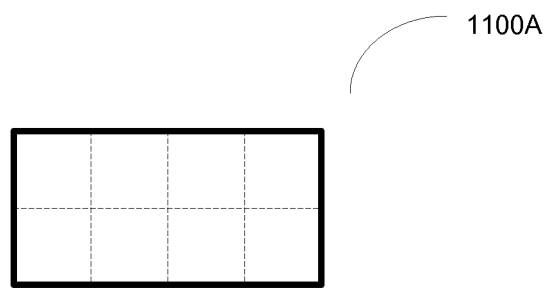
FIGS. 11A-F are illustrations of asymmetric M×N grids providing layouts of the distribution of index values throughout a tile, in accordance with embodiments of the present disclosure.
Figure 11B:
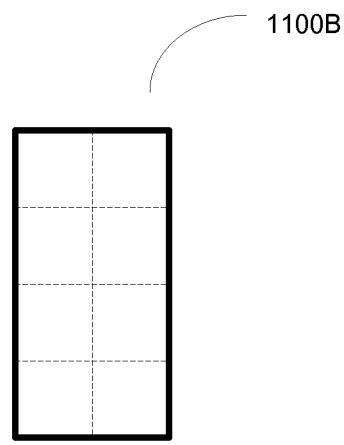

In particular, FIGS. 11A and 11B show a 2×4 rectangular grid of indices with different orientations when applied to a tile. For instance, FIG. 11A illustrates a 2×4 grid 1100A of indices that is then expanded and applied to a tile, wherein the tile may be of various sizes and shapes (e.g., 2×4, 4×2, 4×4, 4×8, 8×4, 8×8, etc.), in one embodiment. FIG. 11B illustrates a 4×2 grid 1100B of indices that is then expanded and applied to a tile, in one embodiment. The grid 1100A is rotated ninety degrees from the orientation of grid 1100B of FIG. 11B.

Figure 11C:
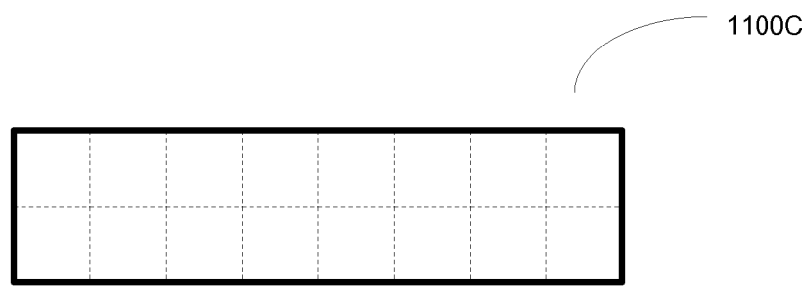
Figure 11D:
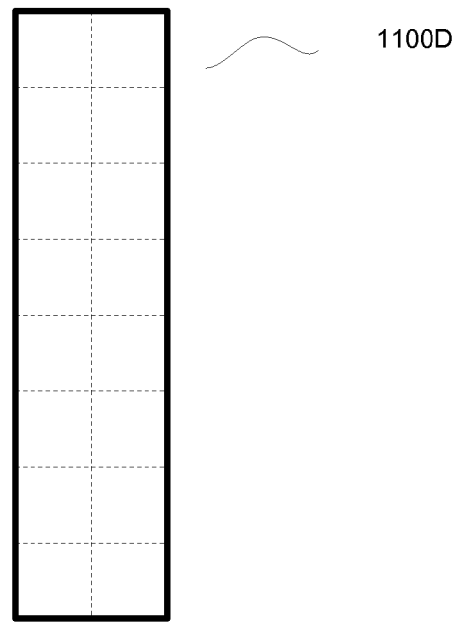

Also, FIGS. 11C and 11D show a 2×8 rectangular grid of indices with different orientations when applied to a tile. For instance, FIG. 11C illustrates a 2×8 grid 1100C of indices that is then expanded and applied to a tile, wherein the tile may be of various sizes and shapes (e.g., 2×4, 4×2, 4×4, 4×8, 8×4, 8×8, etc.), in one embodiment. FIG. 11D illustrates an 8×2 grid 1100D of indices that is then expanded and applied to a tile. The grid 1100C is rotated ninety degrees from the orientation of grid 1100D of FIG. 11D.

Figure 11E:
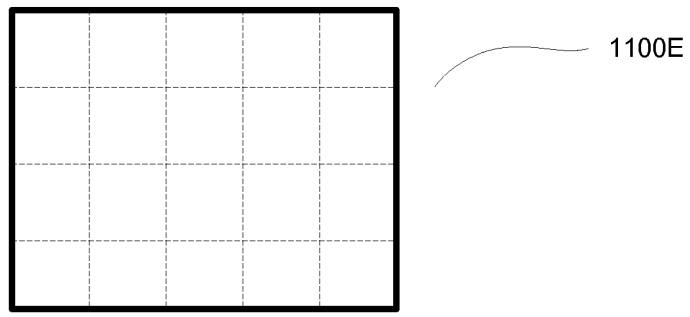
Figure 11F:
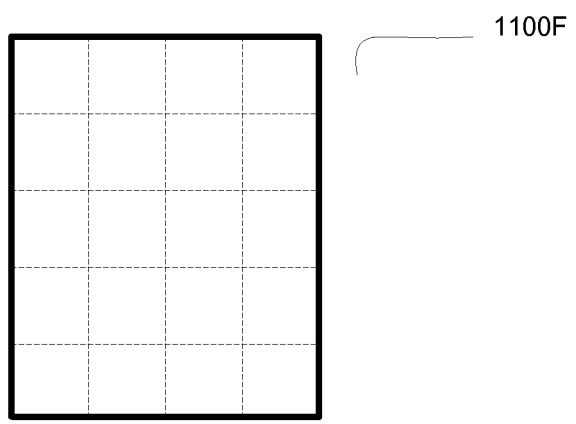

Also, FIGS. 11E and 11F show a 4×5 rectangular grid of indices with different orientations when applied to a tile, in embodiments. For instance, FIG. 11E illustrates a 4×5 grid 1100E of indices that is then expanded and applied to a tile, wherein the tile may be of various sizes and shapes (e.g., 2×4, 4×2, 4×4, 4×8, 8×4, 8×8, etc.), in one embodiment. FIG. 11F illustrates a 5×4 grid 1100F of indices that is then expanded and applied to a tile, in one embodiment. The grid 1100E is rotated ninety degrees from the orientation of grid 1100F of FIG. 11F.

Returning back to FIG. 10, at 1030 the method includes identifying a pixel in the tile. Information related to color and/or texture may be determined from base, delta and corresponding index values associated with the pixel. More particularly, the index values are determined from the M×N rectangular grid of indices, as provide below. The index values are applied to the base, delta, and/or resulting color values to obtain a resulting color for that pixel in the image.

At 1040, the method includes determining a corresponding rectangular grid including the pixel. The rectangular grid is defined by a group of four indices from the asymmetric M×N rectangular grid of indices. That is, the corresponding rectangular grid is a subset of the asymmetric M×N rectangular grid that is expanded to fit the tile.

Figure 12:
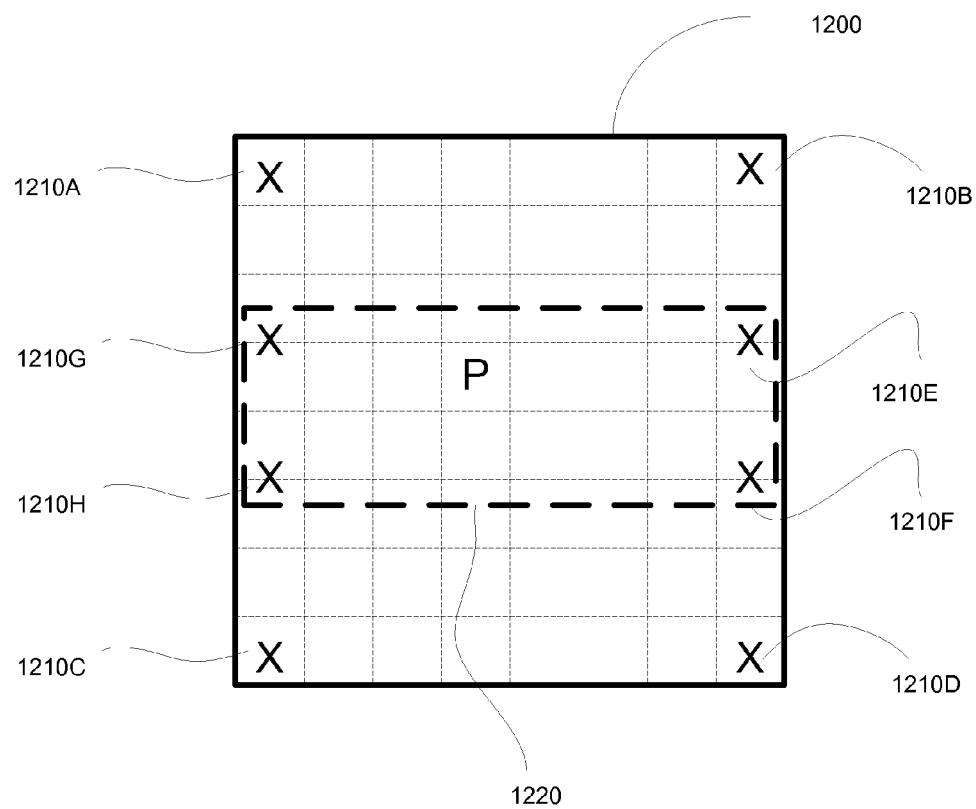
FIG. 12 is a diagram of a tile illustrating the application of an M×N (e.g., 4×2) grid of indices across the tile, in accordance with one embodiment of the present disclosure.

In one embodiment, the corresponding rectangular grid comprises a group of the four nearest indices, by location. For example, FIG. 12 is a diagram of a tile 1200 illustrating the application of an M×N (e.g., 4×2) grid of indices across the tile 1200, in one embodiment. The M×N grid of indices includes indices 1210A-H. In one embodiment, the M×N grid includes indices located at pixels at the corners of the tile 1200. As shown by FIG. 12, to determine a pixel value for pixel P, the four nearest indices are selected to define a group of indices. The group of indices includes indices 1210 E-H, and also defines a corresponding rectangular grid.

In one embodiment, the corresponding rectangular grid 1220 has sides that are parallel to the sides of the tile 1200. In still another embodiment, the M×N grid of indices comprises sides that are parallel to the sides of the tiles 1200, whether the M×N grid is expanded to fit the tile 1200 or not expanded.

Returning back to FIG. 10, at 1050, the method includes determining an index for the pixel by filtering the group of indices of the corresponding rectangular grid in relation to the pixel. In one embodiment, the filtering applied is a bilinear filtering process. As shown in FIG. 12, bilinear filtering is applied to indexes 1210E-H to determine the index value of the pixel P.

Figure 13:
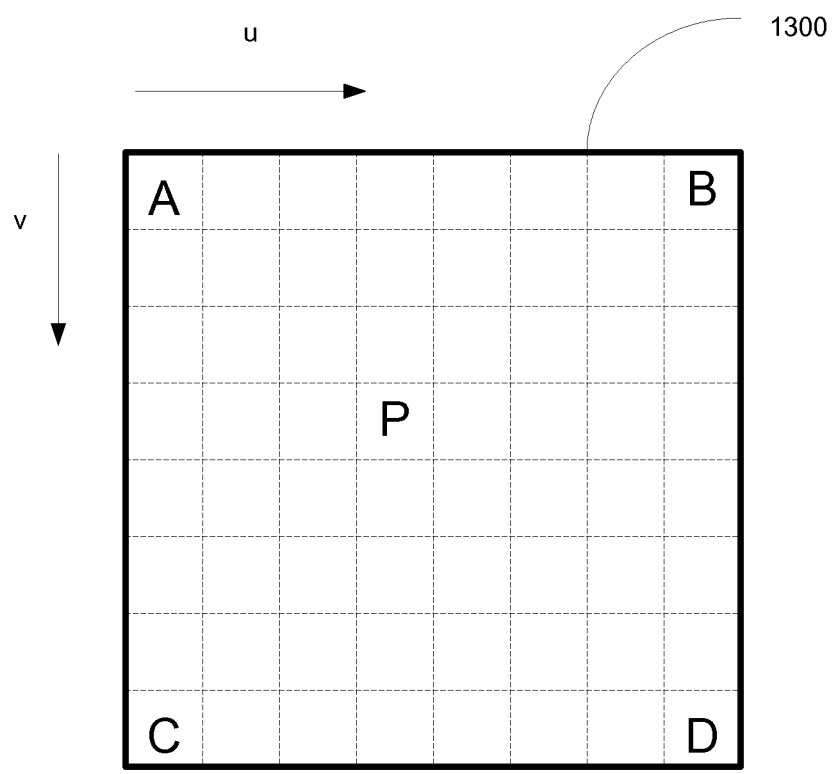
FIG. 13 is a diagram of a tile 1300 comprising a plurality of pixels at various locations illustrating the application of bilinear filtering to determine an index value of a pixel P, in accordance with one embodiment of the present disclosure.

FIG. 13 is a diagram of a tile 1300 comprising a plurality of pixels at various locations, in accordance with one embodiment of the present disclosure. Equation 1 provided below illustrates a bilinear filtering application for determining an index values of P, given index values at points A-D. Pixel P is located at coordinates (u,v), where u and v define distances, in one embodiment. As such, given an pixel, and its corresponding rectangular grid comprising a group of indices, through bilinear filtering an index value is determined for that pixel. Equation 1 is a simplification of the bilinear function for determining the index value at P, where the distance between points A, B, C, and D is unit, as follows:

$$\text{Index}(P) = \text{Index}(A)(1-u)(1-v) + \text{Index}(B)(u)(1-v) + \text{Index}(C)(v) + \text{Index}(D)(u)(v) \quad (1)$$

Figure 14:
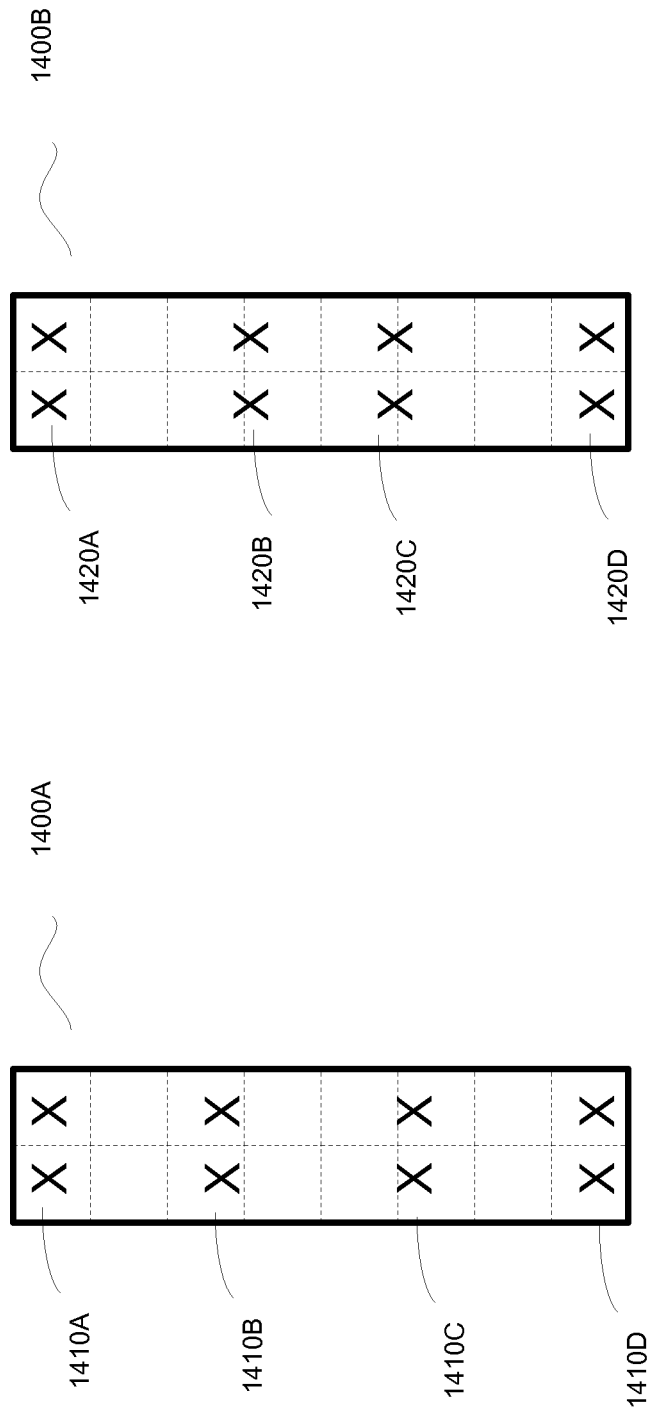
FIG. 14A provides an illustration of balancing the distribution of indices throughout the M×N rectangular grid of indices, in accordance with one embodiment of the present disclosure.
FIG. 14B provides an illustration of unbalancing the distribution of indices throughout the M×N rectangular grid of indices, in accordance with one embodiment of the present disclosure.

In one embodiment, the plurality of indices is balanced throughout the tile. For instance, FIG. 14A provides an illustration of balancing the distribution of indices throughout the M×N rectangular grid 1400A, in one embodiment. As shown, the asymmetric M×N rectangular grid 1400A comprises a 4×2 grid. The locations of index values is evenly distributed vertically, such that the distance between index values 1410A-D is substantially constant. This gives a smoother transition index values in the vertical direction. On the other hand, FIG. 14B provides an illustration of the unbalanced distribution of indices throughout the M×N rectangular grid 1400B, in one embodiment. As shown, the asymmetric M×N rectangular grid 1400B comprises a 4×2 grid. However, the locations of index values is not evenly distributed vertically, such that the distance between index values 1410A-D varies depending on which two index values are chosen. For example, the distance between index values 1420A and B is much greater than the distance between index values 1420B and C. This gives more accurate indexing values between points 1420B-C, but less accurate indexing values between points 1420A-B and 1420C-D.

In still other embodiments, the filtering is limited to horizontal filtering, as previously discussed. Also, in other embodiments, the filtering is limited to vertical filtering, as previously discussed.

FIG. 15 is a flow diagram 1500 depicting a computer implemented method for indexing in an image decoder, in accordance with one embodiment of the present disclosure. The operations performed by flow diagram 1500 are implemented by the index renderer 900 as illustrated in FIG. 9, in one embodiment.

At 1510, a tile in an image is identified. The image comprises a plurality of tiles, wherein each tile includes color and/or texture data that is associated with a plurality of pixels. Each tile is associated with a base value, a delta value, and a plurality of indices, wherein the indices provide weighting information for pixels in the tile. For instance, corresponding base, delta and index values are used for determining color and/or texture information for a pixel in the corresponding tile.

At 1520, the method includes partitioning a rectangular grid into a first index and a second index configured in a specified pattern. In one embodiment, the specified pattern fits within a 4×4 configuration. In other embodiments, the specified pattern fits within a smaller or larger, symmetric, or asymmetric configuration.

At 1530, the method includes applying the rectangular grid to the tile for purposes of determining pixels in the tile. This process may include expanding the rectangular grid to fit the dimensions of the tile, in one embodiment. In another embodiment, this process may include contracting the rectangular grid to fit the dimensions of the tile. Expansion and/or contraction may occur in either the horizontal, vertical, both directions, or other non-orthogonal directions according to embodiments of the present invention.

In still another embodiment, indices within the rectangular grid are filled in after expansion or contraction of the specified pattern. That is, a corresponding index value is determined for the pixel according to the specified pattern. As such, each pixel in the tile is associated with either the first index or the second index. In another embodiment, indices within the rectangular grid are determined by performing filtering after expansion or contraction of the specified pattern. That is, pixels may have index values that are between the first index and the second index values.

As an example, a pixel is identified in the tile. If no index value has been sampled for that pixel, the index value for the pixel is determined by either filling in values with the first or second index, or through bilinear interpolation between indices that surround the pixel. For instance, a group of 4 or 8 indices may be used for interpolation.

Figure 16:
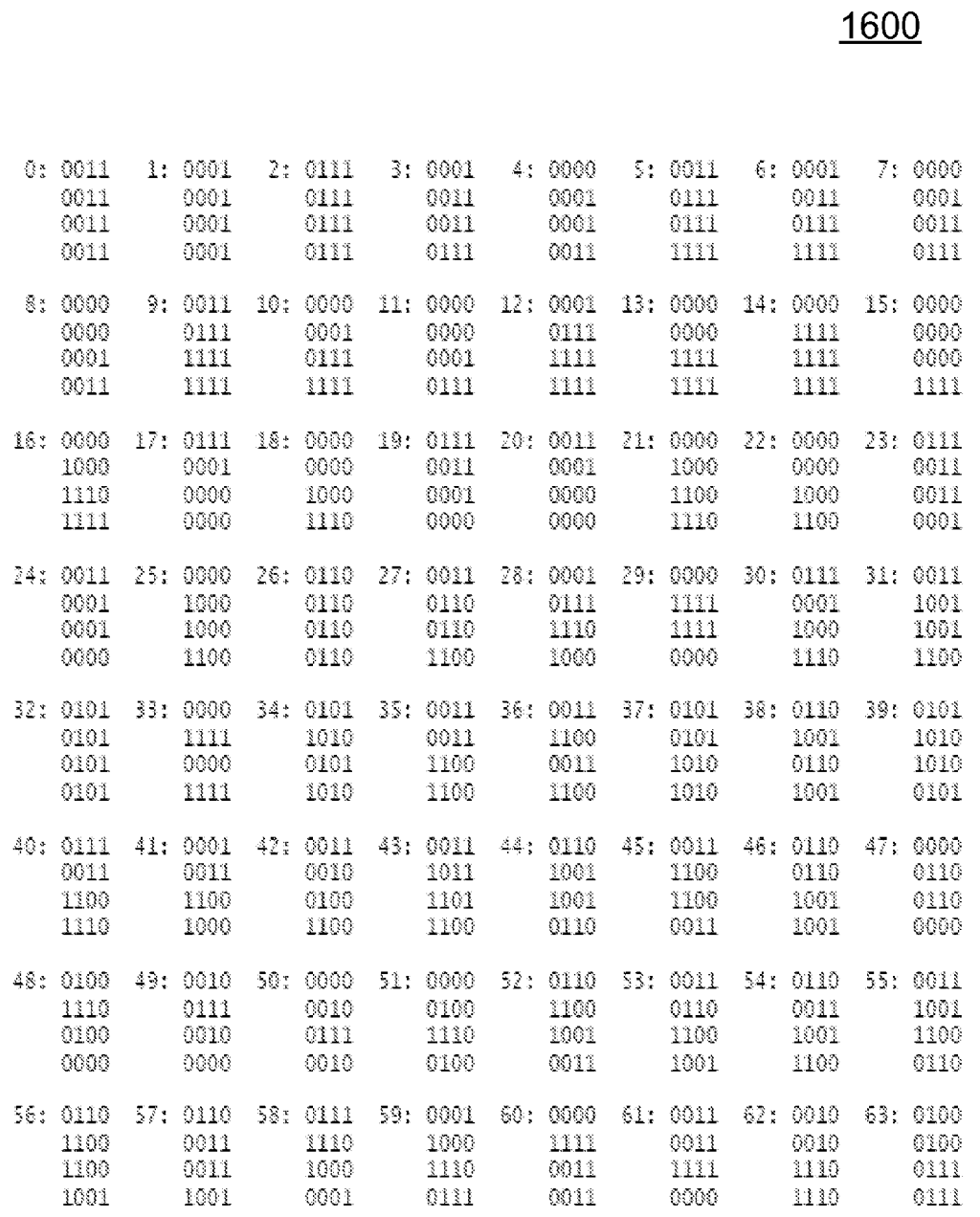

For instance, FIG. 16 is a table 1600 listing sixty-four two-index value partitions, in accordance with one embodiment of the present disclosure. As shown, a first index value of 0 and a second index value of 1 is used to partition a 4×4 rectangular grid, wherein 0 and 1 are representative values. Other patterns of two-index value partitions are supported in other embodiments.

In still other embodiments, the specified pattern of the rectangular grid includes a third index value (e.g., 0, 1, 2). For instance, FIG. 17 is a table 1700 listing sixty-four three-index value partitions, in accordance with one embodiment of the present disclosure. As shown, a first index value of 0, a second index value of 1, and a third index value of 2 are used to partition a 4×4 rectangular grid, wherein 0,1, and 2 are representative values. Other patterns of three-index value partitions are supported in other embodiments.

In another embodiment, the specified pattern of the rectangular grid includes first and second values that are specified, and third and fourth index values that are determined based on the first and second values. For instance, the third and fourth index values are determined through filtering of the first and second values. As an example, the third index value is determined by bilinearly filtering the first and second index values based on first parameter or function. Also, the fourth index value is determined by bilinearly filtering the first and second index values based on a second parameter or function. FIG. 18 is a table 1800 that illustrates how the third index value and fourth index values are determined from the first and second index values, in accordance with one embodiment of the present disclosure. For instance, given that the first index value is x, and the second index value is y, where the index values range from x to y, the third index value is determined using the function illustrated in block 1810, and the fourth index value is determined using the function illustrated in block 1820.

Figure 19:
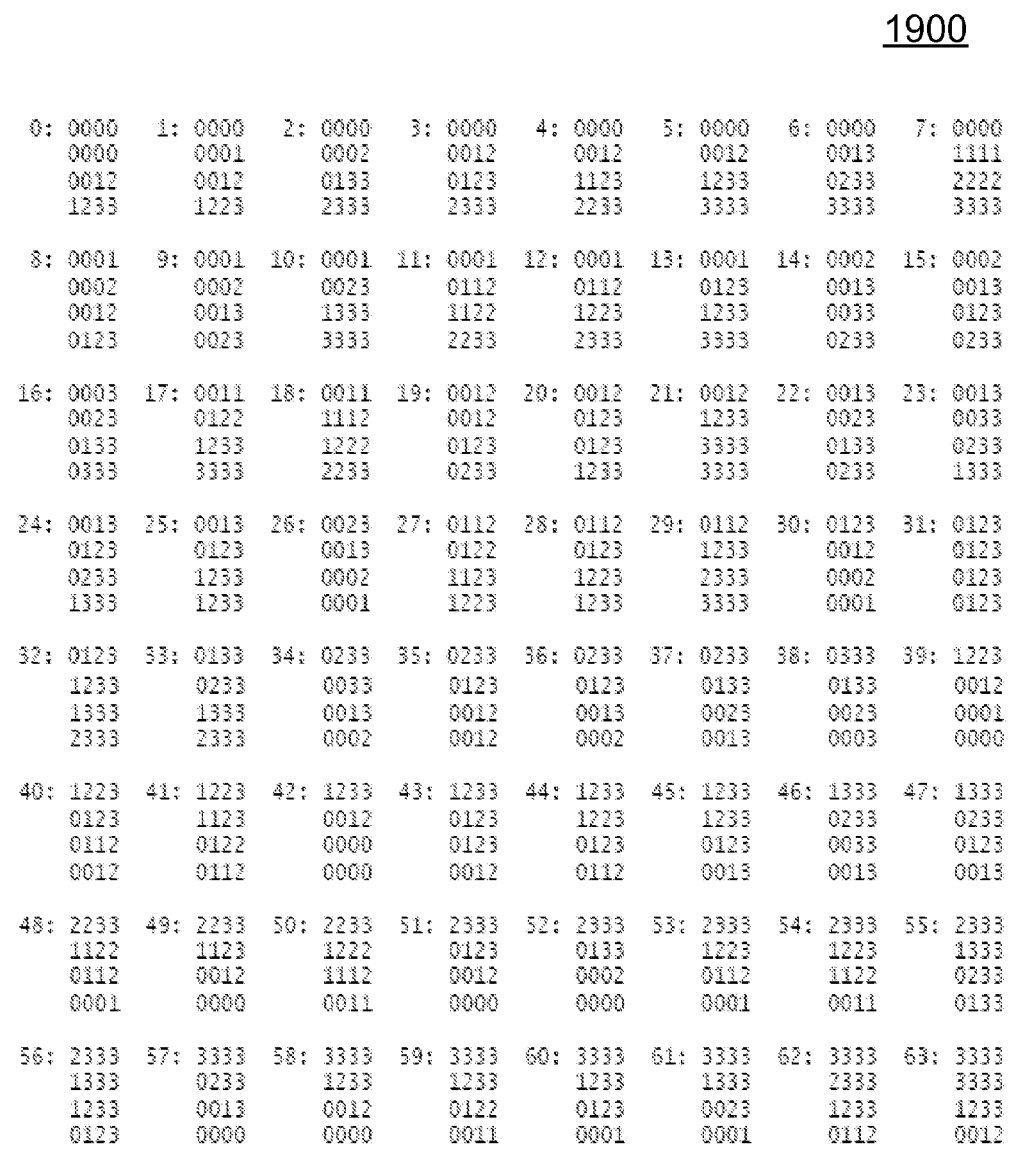

Once all the four index values are determined, the specified pattern of the rectangular grid is configured. For instance, FIG. 19 is a table 1900 listing sixty-four three-index value partitions, in accordance with one embodiment of the present disclosure. As shown, a first index value of 0, a second index value of 1, a third index value of 2, and a fourth index value of 3 are used to partition a 4×4 rectangular grid, wherein 0,1, 2 and 3 are representative values. Other patterns of three-index value partitions are supported in other embodiments.

Thus, according to embodiments of the present disclosure, systems and methods are described in which compression and decompression of index values are performed to store and display color and/or texture information for a pixel in an image. Embodiments of the present invention include the decompression of pixel information based on an asymmetric distribution of indices throughout a tile. Other embodiments disclose the partitioning of two or more index values into a configuration of a specified pattern for a rectangular grid that provides index values for purposes of determining color and/or texture information.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

The invention claimed is:

1. A method for indexing as executed by an image decoder of a processor, comprising:
identifying a tile in an image, wherein said image comprises a plurality of tiles, wherein each tile includes color data associated with a plurality of pixels;
asymmetrically providing a plurality of indices throughout said tile;
identifying a pixel in said tile;
determining a corresponding rectangular grid including said pixel, wherein said corresponding rectangular grid comprises a group of four indices; and
determining an index for said pixel by bilinearly filtering said group of indices in relation to said pixel.

2. The method of claim 1, further comprising:
locating indices of said plurality of indices at corners of said tile.

3. The method of claim 1, further comprising:
configuring said plurality of indices as M×N pixels.

4. The method of claim 1, wherein said corresponding rectangular grid comprises a group of four nearest indices.

5. The method of claim 1, further comprising:
orienting sides of one of said corresponding grid in parallel with corresponding sides of said tile.

6. The method of claim 1, further comprising:
balancing said plurality of indices throughout said tile.

7. The method of claim 1, further comprising:
unbalancing said plurality of indices throughout said tile.

8. The method of claim 1, wherein said determining an index for said pixel by bilinearly filtering a group of indices further comprises:
limiting said filtering to horizontal filtering.

9. The method of claim 1, wherein said determining an index for said pixel by bilinearly filtering a group of indices further comprises:
limiting said filtering to vertical filtering.

10. A method for indexing as executed by an image decoder of a processor, comprising:
identifying a tile in an image, wherein said image comprises a plurality of tiles, wherein each tile includes color data associated with a plurality of pixels;
partitioning a rectangular grid into a first index value and a second index value configured in a specified pattern;
applying said rectangular grid to said tile for purposes of determining index values for pixels in said tile;
identifying a pixel in said tile; and
determining a corresponding index value for said pixel according to said specified pattern.

11. The method of claim 10, further comprising:
expanding said rectangular grid to fit said tile; and
determining said corresponding index value for said pixel by bilinearly filtering a group of indices surrounding said pixel from said specified pattern.

12. The method of claim 11, wherein said expanding said first rectangular grid comprises:
expanding said first rectangular grid in a horizontal direction.

13. The method of claim 11, wherein said expanding said first rectangular grid comprises:
expanding said first rectangular grid in a vertical direction.

14. The method of claim 10, further comprising:
configuring said specified pattern of said rectangular grid with a third index value.

15. The method of claim 10, wherein said partitioning a first rectangular grid further comprises:
determining a third index value by bilinearly filtering said first and second index values based on a first parameter;
determining a fourth index value by bilinearly filtering said first and second index values based on a second parameter; and
configuring said specified pattern of said rectangular grid with a third index value and a fourth index value.

16. A non-transitory computer-readable medium having computer-executable instructions for performing a method for indexing, comprising:
identifying a tile in an image, wherein said image comprises a plurality of tiles, wherein each tile includes color data associated with a plurality of pixels;
asymmetrically providing a plurality of indices throughout said tile;
identifying a pixel in said tile;
determining a corresponding rectangular grid including said pixel, wherein said corresponding rectangular grid comprises a group of four indices; and
determining an index for said pixel by bilinearly filtering said group of indices in relation to said pixel.

17. The computer-readable medium of claim 16, wherein said method for indexing further comprises:
locating said plurality of indices at corners of said tile.

18. The computer-readable medium of claim 16, wherein in said method for indexing, said corresponding rectangular grid comprises a group of four nearest indices.

19. The computer-readable medium of claim 18, wherein said method for indexing further comprises:
balancing said plurality of indices throughout said tile.

* * * * *